United States Patent
Zhang et al.

(10) Patent No.: US 12,347,321 B2
(45) Date of Patent: Jul. 1, 2025

(54) METHOD FOR DETECTING UNAUTHORIZED UNCREWED AERIAL VEHICLE, APPARATUS, AND SYSTEM

(71) Applicant: HUAWEI TECHNOLOGIES CO., LTD., Guangdong (CN)

(72) Inventors: Chengchen Zhang, Shanghai (CN); Lin Shu, Shanghai (CN); Wenfu Wu, Shanghai (CN); Zaifeng Zong, Nanjing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 779 days.

(21) Appl. No.: 17/513,356

(22) Filed: Oct. 28, 2021

(65) Prior Publication Data

US 2022/0051570 A1  Feb. 17, 2022

Related U.S. Application Data

(63) Continuation of application No. PCT/CN2020/079989, filed on Mar. 18, 2020.

(30) Foreign Application Priority Data

Apr. 29, 2019  (CN) .......................... 201910353747.8

(51) Int. Cl.
*H04W 4/02* (2018.01)
*G08G 5/20* (2025.01)
(Continued)

(52) U.S. Cl.
CPC ................ *G08G 5/20* (2025.01); *H04W 4/02* (2013.01); *H04W 4/027* (2013.01); *H04W 4/029* (2018.02);
(Continued)

(58) Field of Classification Search
CPC ..... H04W 12/06; H04W 84/06; H04W 76/27; H04W 12/08; H04W 4/029; H04W 12/63; G08G 5/0013; G08G 5/0043
See application file for complete search history.

(56) References Cited

U.S. PATENT DOCUMENTS 9,412,278 B1 *  8/2016  Gong .................. G08G 5/0086
9,524,648 B1 * 12/2016  Gopalakrishnan ... G08G 5/0069
(Continued)

FOREIGN PATENT DOCUMENTS

| CN | 107945581 A | 4/2018 |
| CN | 108073181 A | 5/2018 |

(Continued)

OTHER PUBLICATIONS

3GPP TR 22.825 V16.0.0 (Sep. 2018), "3rd Generation Partnership Project; Technical Specification Group Services and System Aspects; Remote Identification of Unmanned Aerial Systems; Stage 1(Release 16)," Sep. 2018, 22 pages.
(Continued)

*Primary Examiner* — Dino Kujundzic
(74) *Attorney, Agent, or Firm* — Fish & Richardson P.C.

(57) ABSTRACT

Embodiments of this application provide a method for detecting an unauthorized uncrewed aerial vehicle, an apparatus, and a system. An AMF sends a tracking indication message to a network device, where the tracking indication message is used to indicate to report attribute information of user equipment in a coverage area of the network device when the attribute information of the user equipment meets a preset condition; and obtains the attribute information of the user equipment. In this way, after the attribute information of the user equipment is obtained, an identity status of the user equipment may be identified based on the attribute information of the user equipment, that is, whether the user equipment is an unauthorized uncrewed aerial vehicle is
(Continued)

identified. This implements detection on an unauthorized uncrewed aerial vehicle that has accessed the 3GPP network.

20 Claims, 7 Drawing Sheets

(51) Int. Cl.
*H04W 4/029* (2018.01)
*H04W 12/06* (2021.01)
*B64U 10/14* (2023.01)
*B64U 101/20* (2023.01)

(52) U.S. Cl.
CPC ............ *H04W 12/06* (2013.01); *B64U 10/14* (2023.01); *B64U 2101/20* (2023.01)

(56) References Cited

U.S. PATENT DOCUMENTS

| | | | | |
|---|---|---|---|---|
| 9,767,699 | B1* | 9/2017 | Borghese | G08G 5/0021 |
| 10,061,018 | B1* | 8/2018 | Naboulsi | G01S 7/4804 |
| 10,080,098 | B1* | 9/2018 | Edge | H04L 63/08 |
| 10,089,885 | B1* | 10/2018 | Beckman | G08G 5/0013 |
| 10,170,011 | B2* | 1/2019 | Castelli | G05D 1/0083 |
| 10,560,918 | B1* | 2/2020 | Lau | H04W 68/02 |
| 10,854,019 | B1* | 12/2020 | Barnes | G08G 5/0069 |
| 11,272,371 | B2* | 3/2022 | Zhu | G08G 5/0026 |
| 11,849,331 | B2* | 12/2023 | Lee | H04W 12/69 |
| 11,972,009 | B2* | 4/2024 | Pierce | G06F 21/602 |
| 2006/0050888 | A1* | 3/2006 | Svensson | H04W 12/06 |
| | | | | 380/277 |
| 2015/0302858 | A1* | 10/2015 | Hearing | G01H 1/00 |
| | | | | 381/58 |
| 2016/0047628 | A1* | 2/2016 | Kolanek | F41G 7/007 |
| | | | | 701/4 |
| 2016/0245907 | A1* | 8/2016 | Parker | B64C 39/024 |
| 2017/0015414 | A1 | 1/2017 | Chan et al. | |
| 2017/0076610 | A1* | 3/2017 | Liu | H04W 4/021 |
| 2017/0094527 | A1* | 3/2017 | Shattil | H04K 3/92 |
| 2017/0148467 | A1* | 5/2017 | Franklin | G10L 25/39 |
| 2017/0192089 | A1* | 7/2017 | Parker | F41H 13/0075 |
| 2018/0081355 | A1* | 3/2018 | Magy | H04K 3/65 |
| 2018/0096609 | A1* | 4/2018 | de la Cruz | G08G 5/0026 |
| 2018/0107182 | A1* | 4/2018 | Mohamadi | G06V 10/82 |
| 2018/0262924 | A1* | 9/2018 | Dao | H04W 72/535 |
| 2018/0278844 | A1* | 9/2018 | Tian | H04N 23/66 |
| 2018/0367303 | A1* | 12/2018 | Velev | H04L 9/3297 |
| 2019/0180630 | A1* | 6/2019 | Kleinbeck | G06N 3/045 |
| 2019/0212724 | A1* | 7/2019 | Phuyal | H04W 84/042 |
| 2019/0335523 | A1* | 10/2019 | Wu | H04W 76/27 |
| 2019/0364507 | A1* | 11/2019 | De Rosa | B64C 39/024 |
| 2019/0375503 | A1* | 12/2019 | Maxwell | G07C 5/008 |
| 2020/0035041 | A1* | 1/2020 | Crist | G07B 15/00 |
| 2020/0045416 | A1* | 2/2020 | Kamio | G01H 3/125 |
| 2020/0092710 | A1* | 3/2020 | Kim | H04W 8/10 |
| 2020/0322775 | A1* | 10/2020 | Lee | H04W 8/02 |
| 2020/0336901 | A1* | 10/2020 | Zhu | G08G 5/0026 |
| 2021/0144629 | A1* | 5/2021 | Wang | H04W 88/14 |
| 2021/0185528 | A1* | 6/2021 | Zhu | H04W 8/24 |
| 2021/0185738 | A1* | 6/2021 | John | H04L 5/0048 |
| 2021/0206492 | A1* | 7/2021 | Faccin | H04L 67/12 |
| 2021/0314795 | A1* | 10/2021 | Li | H04W 28/0231 |
| 2022/0043931 | A1* | 2/2022 | Pierce | H04W 12/64 |
| 2022/0244376 | A1* | 8/2022 | Hofele | G01S 13/88 |
| 2022/0277657 | A1* | 9/2022 | Xiang | H04W 12/68 |
| 2022/0415191 | A1* | 12/2022 | Mani | G08G 5/0013 |
| 2023/0102300 | A1* | 3/2023 | Faccin | G08G 5/0078 |
| | | | | 455/435.1 |

FOREIGN PATENT DOCUMENTS

| | | | | |
|---|---|---|---|---|
| CN | 108401503 A | | 8/2018 | |
| CN | 108573619 A | | 9/2018 | |
| CN | 109548039 A | | 3/2019 | |
| WO | WO2019074263 | * | 4/2019 | ............ H04W 8/08 |
| WO | WO-2020042911 A1 | * | 3/2020 | ............ H04W 12/00 |
| WO | WO-2020211855 A1 | * | 3/2020 | ............ G08G 5/00 |

OTHER PUBLICATIONS

Huawei et al., "Identification of Air-borne UE," 3GPP TSG-RAN WG2 Meeting #99, R2-1708543, Berlin, Germany, Aug. 21-25, 2017, 3 pages.

Office Action issued in Chinese Application No. 201910353747.8 on Jun. 22, 2021, 17 pages (with English translation).

PCT International Search Report and Written Opinion issued in International Application No. PCT/CN2020/079989 on May 26, 2020, 15 pages (with English translation).

Qualcomm Incorporated et al., "New SID on UAS Identification and Tracking," SA WG2 Meeting #129, S2-1812098, West Palm Beach, Florida, Nov. 26-30, 2018, 4 pages.

* cited by examiner

METHOD FOR DETECTING UNAUTHORIZED UNCREWED AERIAL VEHICLE, APPARATUS, AND SYSTEM

CROSS-REFERENCE TO RELATED APPLICATIONS

This application is a continuation of International Application No. PCT/CN2020/079989, filed on Mar. 18, 2020, which claims priority to Chinese Patent Application No. 201910353747.8, filed on Apr. 29, 2019. The disclosures of the aforementioned applications are hereby incorporated by reference in their entireties.

TECHNICAL FIELD

This application relates to the field of communications technologies, and in particular, to a method for detecting an unauthorized uncrewed aerial vehicle, an apparatus, and a system.

BACKGROUND

With rapid development of electronic technologies and communications technologies, technologies related to uncrewed aerial vehicles (uncrewed aerial vehicles, UAVs) become increasingly mature. A chip having a communication capability is disposed on an uncrewed aerial vehicle, so that the uncrewed aerial vehicle can be used as user equipment (user equipment, UE) to perform a corresponding flight task in the air.

In the conventional technology, if the uncrewed aerial vehicle is an uncrewed aerial vehicle that does not access a 3rd Generation Partnership Project (3rd Generation Partnership Project, 3GPP) network, an uncrewed aerial vehicle controller sends flight data of the uncrewed aerial vehicle to a cloud through the network, so that a regulatory department may detect, based on the flight data on the cloud, whether the uncrewed aerial vehicle violates regulations; or a regulatory department may detect, by using an uncrewed aerial vehicle detection and countermeasures device, whether the uncrewed aerial vehicle violates regulations, so as to detect the uncrewed aerial vehicle. Generally, when user equipment accessing the 3GPP network requests to use an uncrewed aerial system communication capability, the user equipment needs to be authenticated and authorized by an uncrewed aerial system traffic management (uncrewed aerial system traffic management, UTM) network element. Currently, there is no suitable method for identifying or detecting an uncrewed aerial vehicle that accesses a 3GPP network but is not authorized. An unauthorized uncrewed aerial vehicle may be understood as user equipment that meets the following condition: user equipment does not have the uncrewed aerial system (uncrewed aerial system, UAS) communication capability, and a mobility attribute of the user equipment matches a mobility attribute of the uncrewed aerial vehicle; or user equipment has the uncrewed aerial system communication capability, and it is indicated during registration that the uncrewed aerial system communication capability is not used, but a mobility attribute of the user equipment matches a mobility attribute of the uncrewed aerial vehicle; or user equipment has the uncrewed aerial system communication capability, it is indicated during registration that the uncrewed aerial system communication capability is used, and a mobility attribute of the user equipment matches a mobility attribute of the uncrewed aerial vehicle, but mobility attribute information of the user equipment does not match mobility attribute information allowed by subscription information of the user equipment. The uncrewed aerial system communication capability is a capability that is requested by user equipment accessing a 3GPP system from the 3GPP system and that is allowed by the 3GPP system or based on subscription data for uncrewed aerial system communication. Generally, when using the uncrewed aerial system communication capability, the user equipment needs to meet a specific condition, that is, specific mobility attribute information. The mobility attribute information includes attribute information that restricts mobility of the user equipment, such as a specific time range, a specific space range, and a movement speed. An uncrewed aerial system herein includes an uncrewed aerial vehicle and an uncrewed aerial vehicle controller.

An unauthorized uncrewed aerial vehicle has great negative impact on individuals and the society, and may cause inestimable loss of life and property. Therefore, how to detect an uncrewed aerial vehicle that has accessed a 3GPP network but is not authorized is a technical problem to be urgently resolved by a person skilled in the art.

SUMMARY

This application provides a method for detecting an unauthorized uncrewed aerial vehicle, an apparatus, and a system, to detect an unauthorized uncrewed aerial vehicle that has accessed a 3GPP network but is not authorized.

According to a first aspect, an embodiment of this application provides a method for detecting an unauthorized uncrewed aerial vehicle, and the method for detecting an unauthorized uncrewed aerial vehicle may include:

sending a tracking indication message to a network device, where the tracking indication message is used to indicate to report attribute information of user equipment in a coverage area of the network device when the attribute information of the user equipment meets a preset condition, and the attribute information includes location information and/or speed information;

obtaining the attribute information of the user equipment; and identifying an identity status of the user equipment based on the attribute information of the user equipment, where the identity status includes an authorized uncrewed aerial vehicle or an unauthorized uncrewed aerial vehicle.

It can be learned that, according to the method for detecting an unauthorized uncrewed aerial vehicle provided in this embodiment of this application, the AMF sends the tracking indication message to the network device, where the tracking indication message is used to indicate to report the attribute information of the user equipment in the coverage area of the network device when the attribute information of the user equipment meets the preset condition; and obtains the attribute information of the user equipment. In this way, after the attribute information of the user equipment is obtained, the identity status of the user equipment may be identified based on the attribute information of the user equipment, that is, whether the user equipment is an unauthorized uncrewed aerial vehicle is identified. This implements detection on an unauthorized uncrewed aerial vehicle that has accessed a 3GPP network.

In a possible implementation, the identifying an identity status of the user equipment based on the attribute information of the user equipment may include:

identifying an identity of the user equipment based on the attribute information of the user equipment and subscription data of the user equipment, to obtain the identity status of the user equipment.

In a possible implementation, before the identifying an identity of the user equipment based on the attribute information of the user equipment and subscription data of the user equipment, the method may further include:

sending a subscription data query message to a unified data management (UDM) network element, where the query message is used to indicate the UDM device to query the subscription data of the user equipment; and receiving a subscription data response message from the UDM, where the subscription data response message includes the subscription data of the user equipment, so that the AMF may identify the identity of the user equipment based on both the attribute information of the user equipment and the subscription data of the user equipment, to obtain the identity status of the user equipment.

In a possible implementation, the identifying an identity status of the user equipment based on the attribute information of the user equipment may include:

sending an analysis request message to a network data analytics network element (NWDAF), where the analysis request message includes the attribute information of the user equipment, and the analysis request message is used to indicate the NWDAF device to identify the identity status of the user equipment based on the attribute information of the user equipment; and receiving an analysis response message from the NWDAF device, where the analysis response message includes the identity status of the user equipment, so that the AMF does not need to identify the identity of the user equipment based on the attribute information of the user equipment and the subscription data of the user equipment, but the AMF only needs to receive an identification result, thereby reducing load of the AMF.

In a possible implementation, if the identity status of the user equipment is an unauthorized uncrewed aerial vehicle, the method for detecting an unauthorized uncrewed aerial vehicle may further include:

sending an unauthorized uncrewed aerial vehicle reporting message to an uncrewed aerial vehicle traffic management UTM network element device, where the unauthorized uncrewed aerial vehicle reporting message is used to indicate that the user equipment is an unauthorized uncrewed aerial vehicle, so that the UTM can learn the identity status of the user equipment.

In a possible implementation, if the identity status of the user equipment is an unauthorized uncrewed aerial vehicle, the method for detecting an unauthorized uncrewed aerial vehicle may further include:

sending a restriction indication message to the network device, where the restriction indication information is used to indicate the network device to restrict an available network resource of the user equipment. Restricting the available network resource of the user equipment may be understood as rejecting data sending and receiving of the user equipment, or allowing only signal sending and receiving of the user equipment, or not allowing a handover, or resuming data sending and receiving of the user equipment when a height or speed is less than a specific height or speed, or providing only a service with a relatively-low QoS requirement, or another measure used to restrict the user equipment from using a network resource.

In a possible implementation, the sending a tracking indication message to the network device may include:

receiving a subscription data change notification message from the UDM, where the subscription data change notification message is used to indicate that the subscription data of the user equipment has changed; and sending the tracking indication message to the network device based on the subscription data change notification message.

In a possible implementation, the sending a tracking indication message to the network device may include:

receiving a detection request message from the UTM; and
sending the tracking indication message to the network device.

In a possible implementation, the detection request message includes information about a specific area, and the sending the tracking indication message to the network device may include:

sending the tracking indication message to the network device if an intersection area exists between a registration area of the user equipment and the specific area.

According to a second aspect, an embodiment of this application further provides a method for detecting an unauthorized uncrewed aerial vehicle, and the method for detecting an unauthorized uncrewed aerial vehicle may include:

receiving a tracking indication message from an access and mobility management function (AMF) network element, where the tracking indication message is used to indicate to report attribute information of user equipment in a coverage area of the network device when the attribute information of the user equipment meets a preset condition, and the attribute information includes location information and/or speed information; and sending the attribute information of the user equipment to the AMF.

In a possible implementation, before the sending the attribute information of the user equipment to the AMF, the method may further include:

sending a location reporting indication message to the user equipment, where the location reporting indication message is used to indicate to report the attribute information of the user equipment when the attribute information of the user equipment meets the preset condition; and receiving the attribute information from the user equipment.

In a possible implementation, if the user equipment is an unauthorized uncrewed aerial vehicle, the method may further include:

receiving a restriction indication message from the AMF, where the restriction indication information is used to indicate the network device to restrict an available network resource of the user equipment.

According to a third aspect, an embodiment of this application further provides a method for detecting an unauthorized uncrewed aerial vehicle, and the method for detecting an unauthorized uncrewed aerial vehicle may further include:

obtaining whether to send a detection request message; and sending the detection request message to an uncrewed aerial vehicle traffic management network element AMF when it is determined to send the detection request message.

In a possible implementation, the detection request message includes information about a specific area.

In a possible implementation, if an identity status of user equipment in a coverage area of a network device is an unauthorized uncrewed aerial vehicle, the method may further include:

receiving an unauthorized uncrewed aerial vehicle reporting message from an access and mobility management function (AMF) network element, where the unauthorized uncrewed aerial vehicle reporting message is used to indicate that the user equipment is an unauthorized uncrewed aerial vehicle.

According to a fourth aspect, an embodiment of this application further provides a communication apparatus. The communication apparatus may include:

a sending unit, configured to send a tracking indication message to a network device, where the tracking indication message is used to indicate to report attribute information of user equipment in a coverage area of the network device when the attribute information of the user equipment meets a preset condition, and the attribute information includes location information and/or speed information; and a processing unit, configured to obtain the attribute information of the user equipment, and identify an identity status of the user equipment based on the attribute information of the user equipment, where the identity status includes an authorized uncrewed aerial vehicle or an unauthorized uncrewed aerial vehicle.

In a possible implementation, the processing unit is specifically configured to identify an identity of the user equipment based on the attribute information of the user equipment and subscription data of the user equipment, to obtain the identity status of the user equipment.

In a possible implementation, the communication apparatus further includes a receiving unit, where the sending unit is further configured to send a subscription data query message to a unified data management (UDM) network element, where the query message is used to indicate the UDM device to query the subscription data of the user equipment; and the receiving unit is configured to receive a subscription data response message from the UDM, where the subscription data response message includes the subscription data of the user equipment.

In a possible implementation, the sending unit is further configured to send an analysis request message to a network data analytics network element NWDAF, where the analysis request message includes the attribute information of the user equipment, and the analysis request message is used to indicate the NWDAF device to identify the identity status of the user equipment based on the attribute information of the user equipment; and the receiving unit is further configured to receive an analysis response message from the NWDAF device, where the analysis response message includes the identity status of the user equipment.

In a possible implementation, if the identity status of the user equipment is an unauthorized uncrewed aerial vehicle, the sending unit is further configured to send an unauthorized uncrewed aerial vehicle reporting message to an uncrewed aerial vehicle traffic management UTM network element device, where the unauthorized uncrewed aerial vehicle reporting message is used to indicate that the user equipment is an unauthorized uncrewed aerial vehicle.

In a possible implementation, if the identity status of the user equipment is an unauthorized uncrewed aerial vehicle, the sending unit is further configured to send a restriction indication message to the network device, where the restriction indication information is used to indicate the network device to restrict an available network resource of the user equipment.

In a possible implementation, the receiving unit is further configured to receive a subscription data change notification message from the UDM, where the subscription data change notification message is used to indicate that the subscription data of the user equipment has changed; and the sending unit is specifically configured to send the tracking indication message to the network device based on the subscription data change notification message.

In a possible implementation, the receiving unit is further configured to receive a detection request message from a UTM; and the sending unit is specifically configured to send the tracking indication message to the network device.

In a possible implementation, the detection request message includes information about a specific area, and the sending unit is specifically configured to send the tracking indication message to the network device if an intersection area exists between a registration area of the user equipment and the specific area.

According to a fifth aspect, an embodiment of this application further provides a communication apparatus. The communication apparatus may include:

a receiving unit, configured to receive a tracking indication message from an access and mobility management function (AMF) network element, where the tracking indication message is used to indicate to report attribute information of user equipment in a coverage area of a network device when the attribute information of the user equipment meets a preset condition, and the attribute information includes location information and/or speed information; and a sending unit, configured to send the attribute information of the user equipment to the AMF.

In a possible implementation, the sending unit is further configured to send a location reporting indication message to the user equipment, where the location reporting indication message is used to indicate to report the attribute information of the user equipment when the attribute information of the user equipment meets the preset condition; and the receiving unit is further configured to receive the attribute information from the user equipment.

In a possible implementation, if the user equipment is an unauthorized uncrewed aerial vehicle, the receiving unit is further configured to receive a restriction indication message from the AMF, where the restriction indication information is used to indicate the network device to restrict an available network resource of the user equipment.

According to a sixth aspect, an embodiment of this application further provides a communication apparatus. The communication apparatus may include:

a processing unit, configured to obtain whether to send a detection request message; and a sending unit, configured to send the detection request message to an uncrewed aerial vehicle traffic management network element AMF when it is determined to send the detection request message.

In a possible implementation, the detection request message includes information about a specific area.

In a possible implementation, if an identity status of user equipment in a coverage area of a network device is an unauthorized uncrewed aerial vehicle, the communication apparatus may further include:

a receiving unit, configured to receive an unauthorized uncrewed aerial vehicle reporting message from an access and mobility management function (AMF) network element, where the unauthorized uncrewed aerial vehicle reporting message is used to indicate that the user equipment is an unauthorized uncrewed aerial vehicle.

According to a seventh aspect, an embodiment of this application further provides a communication apparatus. The communication apparatus may include a memory and a processor, where the memory is configured to store program instructions; and the processor is configured to read the program instructions in the memory, and perform, according to the program instructions in the memory, the method for detecting an unauthorized uncrewed aerial vehicle in any possible implementation of the first aspect, or the method for detecting an unauthorized uncrewed aerial vehicle in any possible implementation of the second aspect, or the method for detecting an unauthorized uncrewed aerial vehicle in any possible implementation of the third aspect.

According to an eighth aspect, an embodiment of this application further provides a computer storage medium, including instructions, where when the instructions are run by one or more processors, a communication apparatus is enabled to perform the method for detecting an unauthorized uncrewed aerial vehicle in any possible implementation of the first aspect, or the method for detecting an unauthorized uncrewed aerial vehicle in any possible implementation of the second aspect, or the method for detecting an unauthorized uncrewed aerial vehicle in any possible implementation of the third aspect.

According to a ninth aspect, an embodiment of this application further provides a chip, where the chip stores a computer program, and when the computer program is executed by a processor, the method for detecting an unauthorized uncrewed aerial vehicle in any possible implementation of the first aspect is performed, or the method for detecting an unauthorized uncrewed aerial vehicle in any possible implementation of the second aspect is performed, or the method for detecting an unauthorized uncrewed aerial vehicle in any possible implementation of the third aspect is performed.

According to a tenth aspect, an embodiment of this application further provides a communication system. The communication system may include user equipment and the communication apparatus in any possible implementation of the fifth aspect.

According to an eleventh aspect, an embodiment of this application further provides a communication system. The communication system may include user equipment and a network device, where the network device is configured to receive a tracking indication message from an access and mobility management function (AMF) network element and send a location reporting indication message to the user equipment, where the tracking indication message is used to indicate to report attribute information of the user equipment in a coverage area of the network device when the attribute information of the user equipment meets a preset condition, and the attribute information includes location information and/or speed information; and the user equipment is configured to send the attribute information of the user equipment to the network device after receiving the location reporting indication message.

According to a twelfth aspect, an embodiment of this application further provides a communication system. The communication system may include the communication apparatus in any possible implementation of the fourth aspect and the communication apparatus in any possible implementation of the fifth aspect.

According to a thirteenth aspect, an embodiment of this application further provides a communication system. The communication system may include an AMF and a network device, where the AMF is configured to send a tracking indication message to a network device, where the tracking indication message is used to indicate to report attribute information of user equipment in a coverage area of the network device when the attribute information of the user equipment meets a preset condition, and the attribute information includes location information and/or speed information;

the network device is configured to send the attribute information of the user equipment to the AMF after receiving the tracking indication message; and the AMF is further configured to identify an identity status of the user equipment based on the attribute information of the user equipment, where the identity status includes an authorized uncrewed aerial vehicle or an unauthorized uncrewed aerial vehicle.

In a possible implementation, the AMF is specifically configured to identify an identity of the user equipment based on the attribute information of the user equipment and subscription data of the user equipment, to obtain the identity status of the user equipment.

In a possible implementation, if the identity status of the user equipment is an unauthorized uncrewed aerial vehicle, the AMF is further configured to send a restriction indication message to the network device, where the restriction indication information is used to indicate the network device to restrict an available network resource of the user equipment.

According to a fourteenth aspect, an embodiment of this application further provides a communication system. The communication system may include the communication apparatus in any possible implementation of the fourth aspect and the communication apparatus in any possible implementation of the sixth aspect.

According to a fifteenth aspect, an embodiment of this application further provides a communication system. The communication system may include an AMF and a UTM, where the UTM is configured to obtain whether to send a detection request message, and send the detection request message to the uncrewed aerial vehicle traffic management network element AMF when it is determined to send the detection request message; and the AMF is configured to: after receiving the detection request message, send a tracking indication message to a network device, and identify an identity status of user equipment based on attribute information of the user equipment, where the identity status includes an authorized uncrewed aerial vehicle or an unauthorized uncrewed aerial vehicle, where the tracking indication message is used to indicate to report the attribute information of the user equipment in a coverage area of the network device when the attribute information of the user equipment meets a preset condition, and the attribute information includes location information and/or speed information.

In a possible implementation, the detection request message includes information about a specific area.

In a possible implementation, if the identity status of the user equipment in the coverage area of the network device is an unauthorized uncrewed aerial vehicle, the AMF is further configured to send an unauthorized uncrewed aerial vehicle reporting message to the UTM device, where the unauthorized uncrewed aerial vehicle reporting message is used to indicate that the user equipment is an unauthorized uncrewed aerial vehicle; and the UTM is further configured to receive the unauthorized uncrewed aerial vehicle reporting message from the access and mobility management function (AMF) network element.

According to the method for detecting an unauthorized uncrewed aerial vehicle, the apparatus, and the system that are provided in the embodiments of this application, the AMF sends the tracking indication message to the network device, where the tracking indication message is used to indicate to report the attribute information of the user equipment in the coverage area of the network device when the attribute information of the user equipment meets the preset condition; and obtains the attribute information of the user equipment. In this way, after the attribute information of the user equipment is obtained, the identity status of the user equipment may be identified based on the attribute information of the user equipment, that is, whether the user equipment is an unauthorized uncrewed aerial vehicle is identified. This implements detection on an unauthorized uncrewed aerial vehicle that has accessed a 3GPP network.

DESCRIPTION OF EMBODIMENTS

The embodiments of this application may be applied to a fifth generation (fifth generation, 5G) mobile communication system, or may be applied to another communication system, for example, another mobile communication system that may emerge in the future.

The following describes some terms in this application, to facilitate understanding of a person skilled in the art. It should be noted that when the solutions in the embodiments of this application are applied to a 5G mobile communication system or another mobile communication system that may emerge in the future, names of a network device and a terminal may change, but this does not affect implementation of the solutions in the embodiments of this application.

Figure 1:
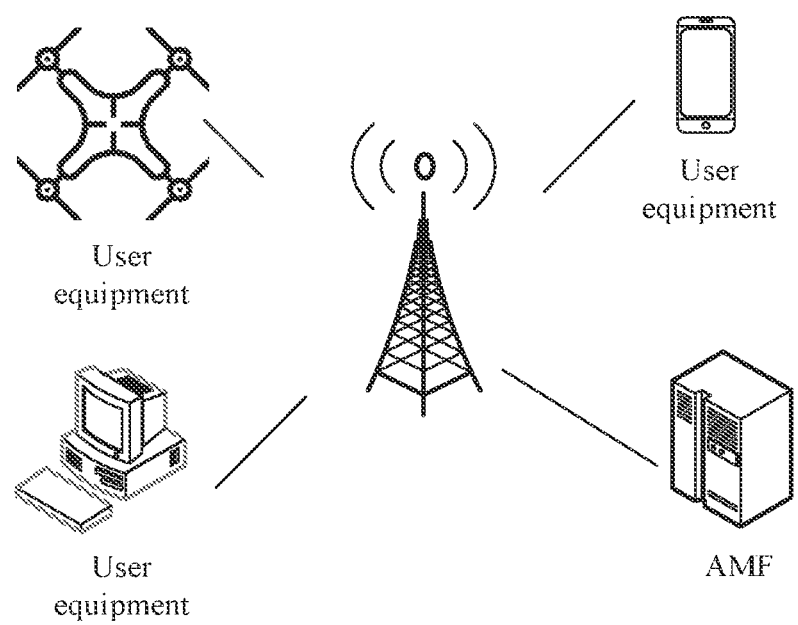
FIG. 1 is a schematic diagram of an application scenario according to an embodiment of this application.

FIG. 1 is a schematic diagram of an application scenario according to an embodiment of this application. For example, refer to FIG. 1. This embodiment of this application may be applied to an uncrewed aerial system (uncrewed aerial system, UAS). A related communication system may include at least one user equipment, a network device, and an access and mobility management network element (access and mobility management function, AMF). Certainly, the communication system may alternatively include a unified data management (Unified Data Management, UDM) network element and an uncrewed aerial vehicle traffic management (uncrewed aerial vehicle traffic management, UTM) network element. To implement detection on an unauthorized uncrewed aerial vehicle that has accessed a 3GPP network, an embodiment of this application provides a method for detecting an unauthorized uncrewed aerial vehicle. An AMF sends a tracking indication message to a network device, where the tracking indication message is used to indicate to report attribute information of user equipment in a coverage area of the network device when the attribute information of the user equipment meets a preset condition, and the attribute information includes location information and/or speed information; and obtains the attribute information of the user equipment. In this way, after the attribute information of the user equipment is obtained, an identity status of the user equipment may be identified based on the attribute information of the user equipment, that is, whether the user equipment is an unauthorized uncrewed aerial vehicle is identified. This implements detection on the unauthorized uncrewed aerial vehicle that has accessed the 3GPP network.

It may be understood that, in this embodiment of this application, the unauthorized uncrewed aerial vehicle may be understood as user equipment that meets the following condition: user equipment does not have an uncrewed aerial system UAS communication capability, and a mobility attribute of the user equipment matches a mobility attribute of an uncrewed aerial vehicle; or user equipment has an uncrewed aerial system communication capability, and it is indicated during registration that the uncrewed aerial system communication capability is not used, but a mobility attribute of the user equipment matches a mobility attribute of an uncrewed aerial vehicle; or user equipment has an uncrewed aerial system communication capability, it is indicated during registration that the uncrewed aerial system communication capability is used, and a mobility attribute of the user equipment matches a mobility attribute of an uncrewed aerial vehicle, but mobility attribute information of the user equipment does not match mobility attribute information allowed by subscription information of the user equipment.

It should be noted that, in this embodiment of this application, the attribute information includes the location information and/or the speed information. It may be understood that the attribute information may include only the location information or the speed information, or may include both the location information and the speed information. This may be specifically set based on an actual requirement. Herein, this is not specifically limited in this embodiment of this application. It may be understood that the location information is not limited to including a horizontal location of the user equipment, and may also include a height of the user equipment. The horizontal location of the user equipment may be determined by using a tracking area identifier, or may be determined in another alternative manner. Height information of the user equipment may be an altitude of the user equipment, an above ground level, or other information used to determine a location of the user equipment in a vertical direction. The speed information may include speed information of the user equipment in a horizontal direction, and may also include a speed of the user equipment in a vertical direction.

In the embodiments of this application, the user equipment (user equipment, UE) is also referred to as a terminal or a terminal device, and is a device that provides voice and/or data connectivity for a user, for example, a hand-held device having a wireless connection function, or a vehicle-mounted device. Common user equipment includes, for example, a mobile phone, a tablet, a notebook computer, a palmtop computer, a mobile internet device (mobile internet device, MID), or a wearable device. The wearable device includes, for example, a smart watch, a smart band, or a pedometer. The user equipment in this application may alternatively be an uncrewed aerial vehicle device having a 3GPP system communication capability.

The network device in the embodiments of this application is also referred to as a radio access network (radio access network, RAN) device, and is an access device for a terminal device to access a mobile communication system in a wireless manner. The network device may be a NodeB (NodeB), an evolved NodeB (evolved NodeB, eNB), a transmission reception point (transmission reception point, TRP), a next generation NodeB (next generation NodeB, gNB) in a 5G mobile communication system, a base station in a future mobile communication system, an access node in a Wi-Fi system, or the like; or may be a module or a unit that completes some functions of the base station, for example, may be a centralized unit (centralized unit, CU), or may be a distributed unit (distributed unit, DU). A specific technology and a specific device form used by the radio access network device are not limited in the embodiments of this application.

In the embodiments of this application, "at least one" means one or more, and "a plurality of" means two or more. The term "and/or" describes an association relationship between associated objects and represents that three relationships may exist. For example, A and/or B may represent the following three cases: only A exists, both A and B exist, and only B exists. A and B may be in a singular or plural form. In the descriptions of this application, the character "/" usually indicates an "or" relationship between associated objects.

It should be noted that an indication, a message, and the like in the embodiments of this application may be a new message type or a new information element, or may be included in an existing message or information element.

Figure 2:
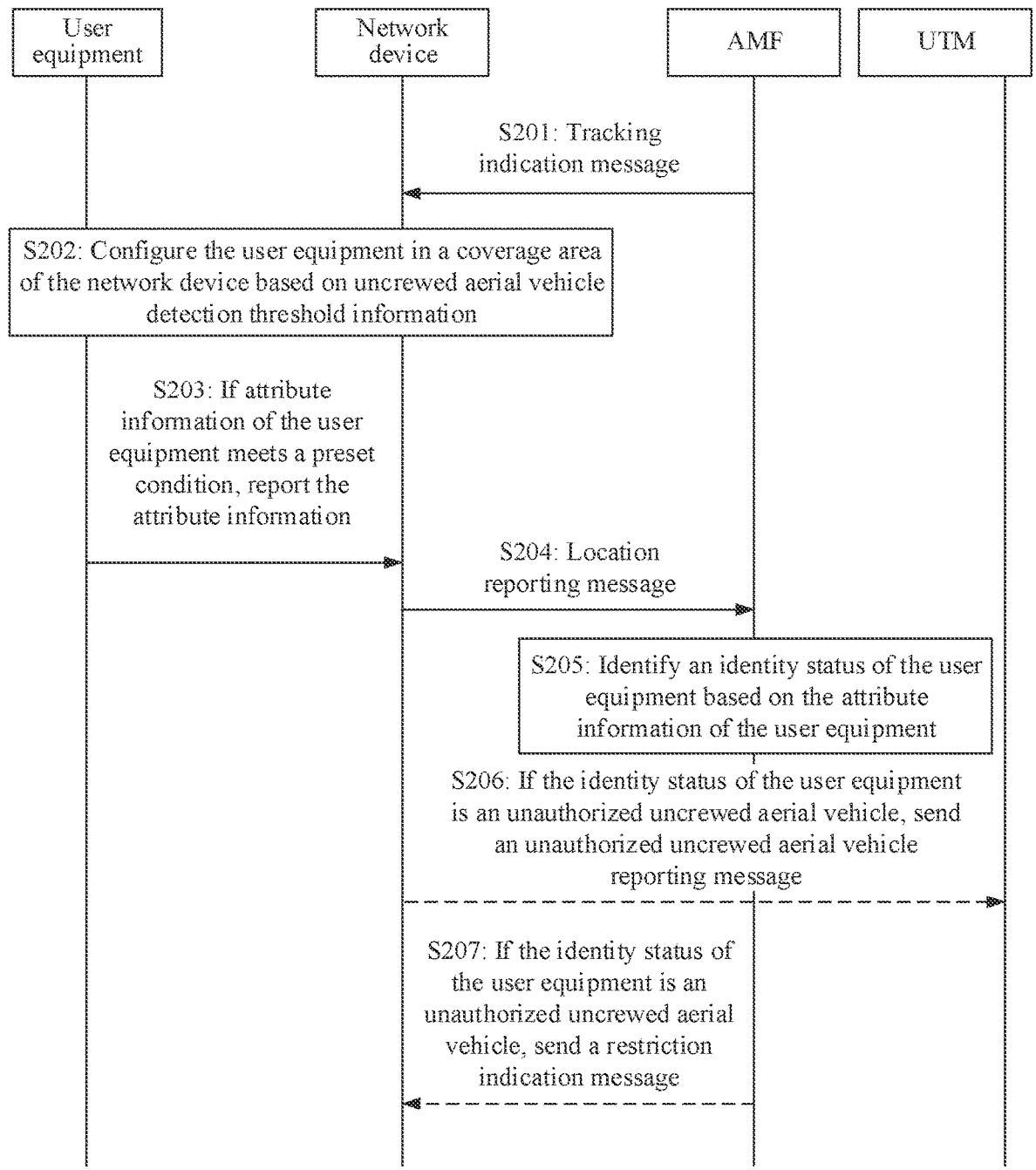
FIG. 2 is a schematic diagram of a method for detecting an unauthorized uncrewed aerial vehicle according to an embodiment of this application.

The following describes, by using detailed embodiments, in detail the method for detecting an unauthorized uncrewed aerial vehicle provided in the embodiments of this application. For example, refer to FIG. 2. FIG. 2 is a schematic diagram of a method for detecting an unauthorized uncrewed aerial vehicle according to an embodiment of this application. In the embodiment shown in FIG. 2, a technical solution to be executed by an AMF when it is determined that user equipment needs to be tracked is provided, but a specific tracking condition is not limited. The method for detecting an unauthorized uncrewed aerial vehicle may include the following steps.

S201: The AMF sends a tracking indication message to a network device.

The tracking indication message is used to indicate to report attribute information of user equipment in a coverage area of the network device when the attribute information of the user equipment meets a preset condition, and the attribute information may include location information and/or speed information. It may be understood that the attribute information of the user equipment reported in this application is not limited to current attribute information of the user equipment, and may further include recent attribute information of the user equipment. Optionally, the tracking indication message may include the preset condition, the preset condition may be uncrewed aerial vehicle detection threshold information, and meeting the preset condition may be understood as being greater than or equal to the uncrewed aerial vehicle detection threshold. For example, when the attribute information of the user equipment includes the location information and/or the speed information, correspondingly, the uncrewed aerial vehicle detection threshold information may include a critical value of an above ground level (AGL) and/or a critical value of a speed of the user equipment. The critical value of the speed may include a critical value of an average moving speed of the user equipment and a critical value of an instantaneous moving speed of the user equipment, and the critical value of the speed may include a value in a horizontal direction and a value in a vertical direction.

In this embodiment of this application, the tracking indication message may indicate a range of user equipment that needs to be detected and that is located in the coverage area of the network device. The range may include all user equipments in the coverage area of the network device; or may include user equipment that is located in the coverage area but does not have an uncrewed aerial system communication capability, or user equipment that is located in the coverage area and has an uncrewed aerial system communication capability but it is indicated that the uncrewed aerial system communication capability is not used; or may include user equipment that is located in the coverage area and uses an uncrewed aerial system communication capability.

Before sending the tracking indication message to the network device, the AMF needs to first obtain the uncrewed aerial vehicle detection threshold information. Optionally, in this embodiment of this application, the uncrewed aerial vehicle detection threshold information obtained by the AMF may be detection threshold information preconfigured by an operator, or may be received detection threshold information sent by a UTM. For example, the AMF may directly receive the uncrewed aerial vehicle detection threshold information sent by the UTM, or indirectly receive the uncrewed aerial vehicle detection threshold information sent by the UTM via a network element such as an NEF. The uncrewed aerial vehicle detection threshold information provided by the UTM may be configured by an aviation regulatory department. It should be noted that, when the AMF receives the uncrewed aerial vehicle detection threshold information sent by the UTM, and the operator also configures the uncrewed aerial vehicle detection threshold information for the AMF, the AMF may determine a smaller value of the two types of uncrewed aerial vehicle detection threshold information as uncrewed aerial vehicle target detection threshold information, and send the target detection threshold information to the network device.

After receiving the tracking indication message sent by the AMF, the network device may configure the user equipment in the coverage area of the network device based on the uncrewed aerial vehicle detection threshold information included in the indication message, that is, perform the following S202.

S202: The network device configures the user equipment in the coverage area of the network device based on the uncrewed aerial vehicle detection threshold information.

For example, when the network device configures the user equipment in the coverage area of the network device based on the uncrewed aerial vehicle detection threshold information, if the network device has obtained a type of the user equipment, that is, has determined whether the user equipment has the uncrewed aerial system communication capability or has a capability selected during registration of user equipment that has the uncrewed aerial system communication capability, to be specific, whether the user equipment that has the uncrewed aerial system communication capability is registered for flight, the network device may configure the uncrewed aerial vehicle detection threshold information for some user equipments in the coverage area of the network device based on the range of user equipment indicated by the tracking indication message, local configuration, or the like. Conversely, if the network device does not obtain the type of the user equipment, the network device may configure the uncrewed aerial vehicle detection threshold information for all user equipments in the coverage area of the network device. It may be understood that the uncrewed aerial system communication capability in this embodiment of this application refers to an uncrewed aerial system communication capability and that is provided by a 3GPP system, and the uncrewed aerial system communication capability includes an uncrewed aerial system communication capability, that is, a communication capability between an uncrewed aerial vehicle and an uncrewed aerial vehicle controller or a communication capability between uncrewed aerial vehicles, or a communication capability between the uncrewed aerial system and the UTM.

For user equipment in a connected state, the network device may configure threshold information according to the foregoing method. For user equipment in an idle state, when the user equipment is switched from the idle state to a connected state, the network device may first request the user equipment to report attribute information, and then determine, according to the foregoing method and based on the obtained attribute information, whether to configure threshold information or directly report the attribute information to the AMF.

It should be noted that, to enable the user equipment to identify an above ground level of the user equipment, the network device may further provide an average altitude of a current location of the user equipment to the user equipment in the coverage area of the network device, so that the user equipment may determine the above ground level of the user equipment based on the average altitude.

After the network device configures the user equipment in the coverage area of the network device based on the uncrewed aerial vehicle detection threshold information in the foregoing S202, the user equipment may determine, based on the attribute information of the user equipment and the configured uncrewed aerial vehicle detection threshold information, whether to report the attribute information of the user equipment to the network device.

S203: If the attribute information of the user equipment meets the preset condition, the user equipment reports the attribute information of the user equipment to the network device.

It may be understood that, that the attribute information of the user equipment in this embodiment of this application meets the preset condition may mean that a piece of parameter information of the user equipment meets a threshold in the uncrewed aerial vehicle detection threshold information that corresponds to the user equipment; or may mean that a plurality of pieces of parameter information of the user equipment all meet thresholds in uncrewed aerial vehicle detection threshold information that corresponds to the user equipment. It should be noted that, in this application, if the attribute information of the user equipment meets the preset condition, the reported attribute information of the user equipment is not limited to current attribute information of the user equipment, and may further include recent attribute information of the user equipment.

For example, the user equipment may directly or indirectly report the attribute information. For example, for the speed information in the attribute information of the user equipment, the user equipment may directly report a speed value and a direction, or the user equipment may report the location information and a corresponding timestamp, and the speed information of the user equipment may be inferred based on the location information and the corresponding timestamp.

Optionally, when the user equipment reports the attribute information of the user equipment to the network device, the attribute information of the user equipment may meet the preset condition when the user equipment accesses the network device. In this way, once the uncrewed aerial vehicle detection threshold information is configured, the attribute information of the user equipment may be reported to the network device. Alternatively, when the user equipment accesses the network device, the attribute information of the user equipment does not meet the preset condition, but meets the preset condition at a later time point, the user equipment may report the attribute information of the user equipment to the network device. Alternatively, when the user equipment is switched from the idle state to the connected state, after a request of the network device is received, the user equipment may report the attribute information of the user equipment. After receiving the attribute information reported by the user equipment, the network device may send, to the AMF, the attribute information reported by the user equipment, that is, perform the following S204.

S204. The network device sends a location reporting message to the AMF.

The location reporting message may include an identifier of the user equipment and the attribute information of the user equipment, or certainly may include other information. In this embodiment of this application, an example in which the location reporting message may include the identifier of the user equipment and the attribute information of the user equipment is used for description. This does not mean that this embodiment of this application is limited thereto.

Optionally, when sending the location reporting message to the AMF, the network device may directly add attribute information of user equipment to the location reporting message when receiving the attribute information reported by the user equipment, and send the location reporting message to the AMF; or may wait for a preset time period, add attribute information of all user equipments received within the preset time period to the location reporting message in a list form, and send the location reporting message to the AMF. This may be specifically set based on an actual requirement. Herein, how to send the location reporting message is not further limited in this embodiment of this application.

It should be noted that, in this embodiment of this application, when the network device sends the location reporting message to the AMF, the location reporting message may not be limited to including the attribute information reported by the user equipment, and may further include attribute information that is of the user equipment and that is actively measured by the network device. The attribute information reported by the user equipment and the attribute information that is of the user equipment and that is actively measured by the network device are sent to the AMF, so that the AMF can obtain more attribute information of the user equipment, and identify an identity status of the user equipment based on the attribute information. This can further improve identification accuracy.

In some scenarios, the attribute information reported by the user equipment may be replaced with the attribute information that is of the user equipment and that is actively measured by the network device. For example, when the user equipment reaches a threshold or receives an active reporting request from the network device, the user equipment does not report the attribute information of the user equipment in time or does not report the attribute information of the user equipment. In this case, after a preset timer expires, the network device may actively measure the attribute information of the user equipment, and report the obtained attribute information to the AMF. If the measured attribute information exceeds the threshold, the reporting message may also include an identifier indicating that the user equipment does not report the attribute information in time, and the identifier is used as auxiliary information for the AMF to determine an unauthorized uncrewed aerial vehicle. In addition, the network device may periodically or selectively measure the attribute information of the user equipment in a specific time and space range. If the user equipment reports the attribute information of the user equipment after reaching the threshold, but a difference between the attribute information reported by the user equipment and the attribute information actively measured by the network device is greater than a preset threshold, the network device reports the actively measured attribute information to the AMF, where the reporting message may also include an identifier indicating that the information reported by the user equipment is abnormal, and the identifier is used as auxiliary information for the AMF to determine an unauthorized uncrewed aerial vehicle.

S205: The AMF identifies the identity status of the user equipment based on the attribute information of the user equipment.

The identity status includes an authorized uncrewed aerial vehicle or an unauthorized uncrewed aerial vehicle.

Optionally, in this embodiment of this application, the identity status of the user equipment may be identified based on the attribute information of the user equipment in at least two possible implementations.

In a possible implementation, the AMF identifies the identity of the user equipment based on the attribute information of the user equipment and subscription data of the user equipment, to obtain the identity status of the user equipment. For example, the subscription data of the user equipment may include information such as time for which the user equipment is allowed to fly, a location at which the user equipment is allowed to fly (including a height at which the user equipment is allowed to fly), and a speed at which the user equipment is allowed to fly.

Optionally, if the AMF does not have the subscription data of the user equipment, the AMF needs to send a subscription data query message to a unified data management (UDM) network element, where the query message is used to indicate the UDM device to query the subscription data of the user equipment, so as to query the subscription data of the user equipment; and receives a subscription data response message from the UDM, where the subscription data response message includes the subscription data of the user equipment, so that the subscription data of the user equipment is obtained. It should be noted that, if the location reporting message received by the AMF includes the attribute information of the user equipment that exists in a list form, the AMF needs to query, from the UDM, subscription data of the user equipment that exists in a list but does not exist on the AMF.

In another possible implementation, the AMF does not need to identify the identity of the user equipment based on the attribute information of the user equipment and the subscription data of the user equipment, but sends an analysis request message to a network data analytics network element (network data analytics function, NWDAF), so that the NWDAF device identifies the identity status of the user equipment based on the attribute information of the user equipment; and the AMF receives an analysis response message from the NWDAF device, where the analysis response message includes the identity status of the user equipment, so that the identity status of the user equipment is obtained.

The analysis request message includes the attribute information of the user equipment. The attribute information may be attribute information of the user equipment at different time points. The analysis request message is used to indicate the NWDAF device to identify the identity status of the user equipment based on the attribute information of the user equipment. For example, the AMF may send the analysis request message to the NWDAF, to indicate, in a request manner, the NWDAF device to identify the identity status of the user equipment based on the attribute information of the user equipment; or the AMF indicates, in a subscription manner, the NWDAF device to identify the identity status of the user equipment based on the attribute information of the user equipment.

It can be learned that, according to the method for detecting an unauthorized uncrewed aerial vehicle provided in this embodiment of this application, the AMF sends the tracking indication message to the network device, where the tracking indication message is used to indicate to report the attribute information of the user equipment in the coverage area of the network device when the attribute information of the user equipment meets the preset condition; and obtains the attribute information of the user equipment. In this way, after the attribute information of the user equipment is obtained, the identity status of the user equipment may be identified based on the attribute information of the user equipment, that is, whether the user equipment is an unauthorized uncrewed aerial vehicle is identified. This implements detection on an unauthorized uncrewed aerial vehicle that has accessed a 3GPP network.

Optionally, after the AMF identifies the identity status of the user equipment based on the attribute information of the user equipment in S205, if the identity status of the user equipment is an unauthorized uncrewed aerial vehicle, the method for detecting an unauthorized uncrewed aerial vehicle may further include the following steps.

S206: The AMF sends an unauthorized uncrewed aerial vehicle reporting message to the uncrewed aerial vehicle traffic management (UTM) network element device.

The unauthorized uncrewed aerial vehicle reporting message is used to indicate that the user equipment is an unauthorized uncrewed aerial vehicle.

For example, the unauthorized uncrewed aerial vehicle reporting message may include the identifier of the user equipment, recent attribute information, and the like. Optionally, the unauthorized uncrewed aerial vehicle reporting message may further include a type of the unauthorized uncrewed aerial vehicle, that is, user equipment that does not have the uncrewed aerial system communication capability, or user equipment that has the uncrewed aerial system communication capability but is not registered for uncrewed aerial system communication, or user equipment that has the uncrewed aerial system communication capability and is registered for uncrewed aerial system communication but a mobility attribute of the user equipment does not meet a mobility attribute allowed by subscription data. If the location reporting message received by the AMF includes the attribute information of the user equipment that exists in a list form, the AMF may add a list of unauthorized user equipment to the unauthorized uncrewed aerial vehicle reporting message at a time and send the unauthorized uncrewed aerial vehicle reporting message to the UTM. Certainly, the AMF may alternatively add a list of unauthorized user equipment to the unauthorized uncrewed aerial vehicle reporting message in batches and send the unauthorized uncrewed aerial vehicle reporting message to the UTM.

S207: The AMF sends a restriction indication message to the network device.

The restriction indication information is used to indicate the network device to restrict an available network resource of the user equipment.

When identifying that the user equipment is an unauthorized uncrewed aerial vehicle, the AMF may send the restriction indication message to the network device, to indicate the network device to restrict the available network resource of the user equipment. Restricting the available network resource of the user equipment may be understood as rejecting data sending and receiving of the user equipment, or allowing only signal sending and receiving of the user equipment, or not allowing a handover, or resuming data sending and receiving of the user equipment when a height or speed is less than a specific height or speed, or providing only a service with a relatively-low QoS requirement, or another measure used to restrict the user equipment from using a network resource.

It should be noted that S206 and S207 are not sequential in this embodiment of this application. S206 may be performed first, and then S207 is performed. Alternatively, S207 may be performed first, and then S206 is performed. Certainly, S206 and S207 may alternatively be performed at the same time. This may be specifically set based on an actual requirement. Herein, an example in which S206 is performed before S207 is used for description in this embodiment of this application, but this does not mean that this embodiment of this application is limited thereto.

Figure 3:
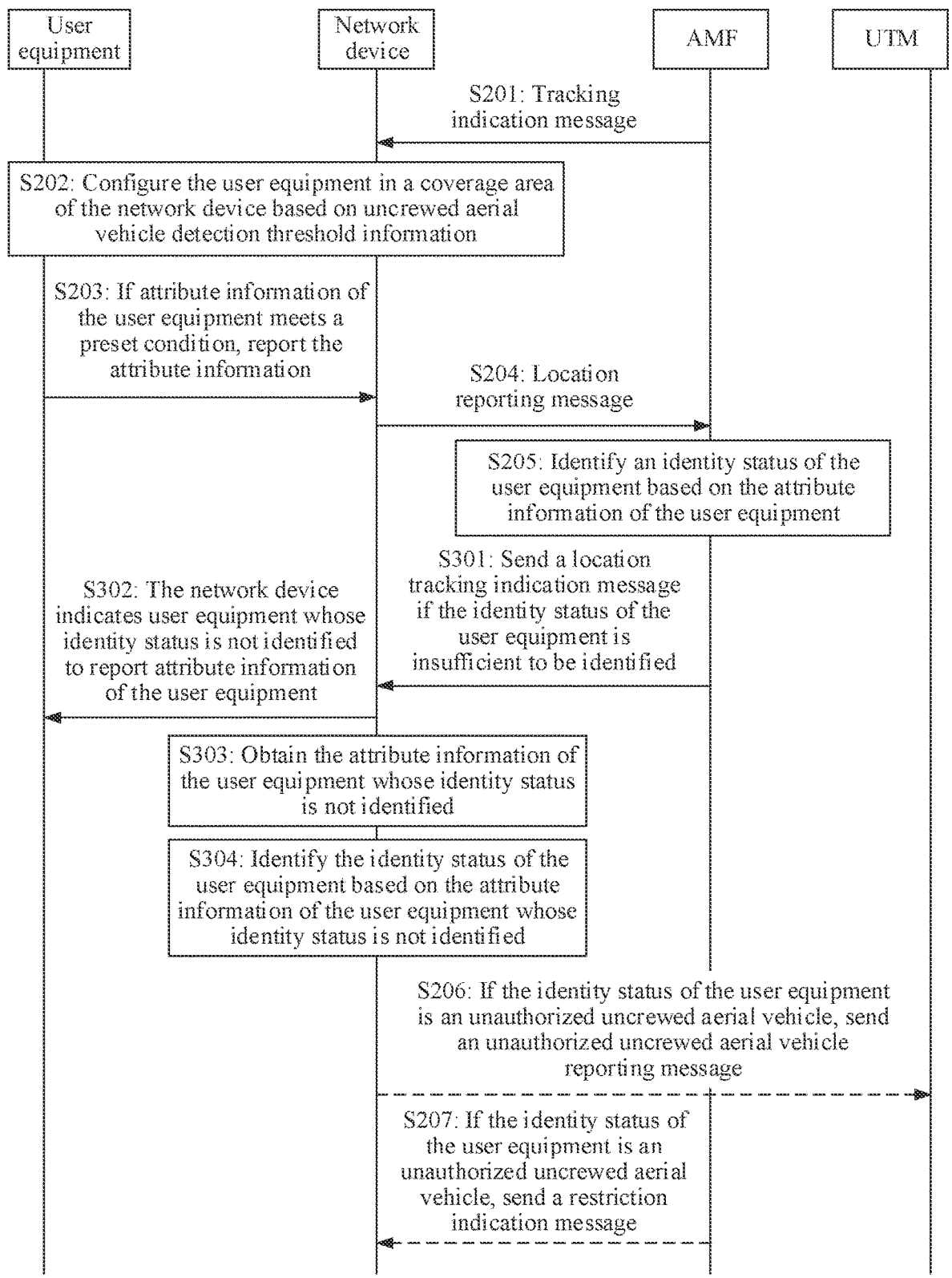
FIG. 3 is a schematic diagram of another method for detecting an unauthorized uncrewed aerial vehicle according to an embodiment of this application.

Based on the embodiment shown in FIG. 2, it should be noted that, in the embodiment shown in FIG. 2, when the AMF identifies the identity status of the user equipment based on the attribute information of the user equipment in S205, if the AMF can identify the identity status of the user equipment based on the received attribute information of the user equipment, the foregoing S206 and S207 may be directly performed. Conversely, if the AMF is insufficient to identify the identity status of the user equipment based on the received attribute information of the user equipment, the AMF may need to continue to track the location of the user equipment within a specific time period, and the AMF needs to obtain attribute information of the user equipment again, so as to identify the identity status of the user equipment based on the attribute information of the user equipment that is obtained again. That the AMF is insufficient to identify the identity status of the user equipment may include that the identity status of the user equipment cannot be identified, and may also include that the identity status of the user equipment is determined as a suspicious unauthorized uncrewed aerial vehicle. For example, refer to FIG. 3. FIG. 3 is a schematic diagram of another method for detecting an unauthorized uncrewed aerial vehicle according to an embodiment of this application. The method for detecting an unauthorized uncrewed aerial vehicle may further include the following steps.

S301: An AMF sends a location tracking indication message to a network device.

For example, the location tracking indication message may include an identifier of user equipment. The user equipment herein may be user equipment that is located in a coverage area of the network device and whose identity status cannot be determined according to the foregoing S201 to S205. There may be one or more user equipments.

It may be understood that, in this embodiment of this application, if identity statuses of some user equipments cannot be identified according to the foregoing S201 to S205, locations of the user equipments may need to continue to be tracked within a specific time period, and attribute information of the user equipments needs to be obtained again. Generally, if the AMF determines that collected attribute information of user equipment is insufficient, or receives a response from an NWDAF, where the response indicates that attribute information of the user equipment needs to continue to be obtained, the AMF needs to send a location tracking indication message to the network device again, so as to identify an identity status of the user equipment based on the attribute information of the user equipment that is obtained again.

For example, in addition to the identifier of the user equipment, the location tracking indication message may further include tracking frequency, reporting frequency, and collection duration. The reporting frequency may mean that, after the network device collects attribute information of the user equipment for a plurality of times, the network device sends a plurality of pieces of attribute information of the user equipment to the AMF at a time, or sends a plurality of pieces of attribute information of the user equipment to the AMF at an interval of a specific time. This may be specifically set based on an actual requirement. Herein, this is not specifically limited in this embodiment of this application.

It may be understood that, if the user equipment is handed over in a process in which the network device obtains the attribute information of the user equipment, the network device may send the location tracking indication message to a new network device, or the AMF sends the location tracking indication message to a new network device, so that the new network device continues to obtain the attribute information of the user equipment.

S302: The network device indicates user equipment whose identity status is not identified to report attribute information of the user equipment.

For example, when the network device indicates the user equipment whose identity status is not identified to report the attribute information of the user equipment, the network device may indicate the user equipment at a time to report the attribute information of the user equipment based on specified frequency, or the network device may request, based on specified frequency, the user equipment to report the attribute information of the user equipment. The reported attribute information may include a timestamp.

Optionally, when reporting the attribute information of the user equipment, the user equipment whose identity status is not identified may report the attribute information of the user equipment to the network device, and then send the attribute information of the user equipment to the AMF via the network device. Alternatively, the user equipment whose identity status is not identified may directly report the attribute information of the user equipment to the AMF, so that the AMF obtains the attribute information of the user equipment whose identity status is not identified.

S303: The AMF obtains the attribute information of the user equipment whose identity status is not identified.

The attribute information may include location information and/or speed information. It may be understood that the attribute information of the user equipment reported in this application is not limited to current attribute information of the user equipment, and may further include recent attribute information of the user equipment.

It should also be noted that, in this embodiment of this application, the attribute information that is of the user equipment whose identity status is not identified and that is obtained by the AMF may not be limited to the attribute information reported by the user equipment whose identity status is not identified, and may further include attribute information that is of the user equipment whose identity status is not identified and that is actively measured by the network device. By obtaining the attribute information reported by the user equipment whose identity status is not identified and the attribute information that is of the user equipment whose identity status is not identified and that is actively measured by the network device, the AMF can obtain more attribute information of the user equipment, and identify the identity status of the user equipment based on the attribute information. This can further improve identification accuracy.

In some scenarios, the attribute information reported by the user equipment whose identity status is not identified may be replaced with the attribute information that is of the user equipment whose identity status is not identified and that is actively measured by the network device. For example, when the user equipment whose identity status is not identified reaches a threshold or receives an active reporting request from the network device, the user equipment whose identity status is not identified does not report, in time, the attribute information of the user equipment whose identity status is not identified or does not report the attribute information of the user equipment whose identity status is not identified. In this case, after a preset timer expires, the network device may actively measure the attribute information of the user equipment whose identity status is not identified, and report the obtained attribute information to the AMF. If the measured attribute information exceeds the threshold, the reporting message may also include an identifier indicating that the user equipment whose identity status is not identified does not report the attribute information in time, and the identifier is used as auxiliary information for the AMF to determine an unauthorized uncrewed aerial vehicle. In addition, the network device may periodically or selectively measure, in a specific time and space range, the attribute information of the user equipment whose identity status is not identified. After reaching the threshold, if the user equipment whose identity status is not identified reports the attribute information of the user equipment whose identity status is not identified, but a difference between the attribute information reported by the user equipment whose identity status is not identified and the attribute information actively measured by the network device is greater than a preset threshold, the network device reports the actively measured attribute information to the AMF, where the reporting message may also include an identifier indicating that the information reported by the user equipment whose identity status is not identified is abnormal, and the identifier is used as auxiliary information for the AMF to determine an unauthorized uncrewed aerial vehicle.

S304: The AMF identifies the identity status of the user equipment based on the attribute information of the user equipment whose identity status is not identified.

It should be noted that a specific implementation process of S304 is similar to an implementation process of S205 in the embodiment shown in FIG. 2. For details, refer to the related description in S205 in the embodiment shown in FIG. 2. Details are not described herein again in this embodiment of this application.

It can be learned that, when the identity status of the user equipment is identified in the foregoing S303 and S304, the AMF obtains the attribute information of the user equipment whose identity status is not identified, so as to identify the identity status of the user equipment based on the attribute information of the user equipment whose identity status is not identified. Certainly, when the identity status of the user equipment is identified, the NWDAF may alternatively obtain the attribute information of the user equipment whose identity status is not identified, so as to identify the identity status of the user equipment based on the attribute information of the user equipment whose identity status is not identified. In this case, when the NWDAF obtains the attribute information of the user equipment whose identity status is not identified, the user equipment whose identity status is not identified may report the attribute information of the user equipment whose identity status is not identified to the network device, and then the network device directly reports the attribute information of the user equipment whose identity status is not identified to the NWDAF; or the network device indirectly reports the attribute information of the user equipment whose identity status is not identified to the NWDAF via a network element such as a UPF; or the user equipment whose identity status is not identified may directly report the attribute information of the user equipment whose identity status is not identified to the NWDAF, so that the NWDAF obtains the attribute information of the user equipment whose identity status is not identified. A difference lies in that, after identifying the identity status of the user equipment based on the attribute information of the user equipment whose identity status is not identified, the NWDAF needs to send an identification result to the AMF, so that the AMF obtains the identity status of the user equipment based on the identification result.

After the identity status of the user equipment is further identified according to the foregoing S301 to S304, if the user equipment is an unauthorized uncrewed aerial vehicle, the foregoing S206 may be performed to send an unauthorized uncrewed aerial vehicle reporting message to an uncrewed aerial vehicle traffic management (UTM) network element device, so that the UTM obtains information about the unauthorized uncrewed aerial vehicle. Certainly, the foregoing S207 may also be performed to send a restriction indication message to the network device, to indicate the network device to restrict an available network resource of the user equipment.

It can be learned that, according to the foregoing embodiments shown in FIG. 2 and FIG. 3, when detecting whether the user equipment is an unauthorized uncrewed aerial vehicle, the AMF sends the tracking indication message to the network device, to indicate to report the attribute information of the user equipment in the coverage area of the network device when the attribute information of the user equipment meets the preset condition; and after receiving the location reporting message sent by the network device, identifies, based on the attribute information included in the location reporting message, whether the user equipment is an unauthorized uncrewed aerial vehicle. If the AMF is insufficient to identify the identity status of the user equipment based on the attribute information included in the received location reporting message, the AMF may need to continue to track the location of the user equipment within the specific time period, and the AMF needs to obtain the attribute information of the user equipment again, to identify the identity status of the user equipment based on the attribute information of the user equipment that is obtained again. This implements detection on an uncrewed aerial vehicle that has accessed a 3GPP network.

It should be noted that, in the embodiment shown in FIG. 2 or FIG. 3, when determining that the user equipment needs to be tracked, the AMF sends the tracking indication message to the network device, to perform the entire method for detecting an unauthorized uncrewed aerial vehicle. However, a specific determining case is not limited. For example, in this embodiment of this application, the AMF may send the tracking indication message to the network device in two possible cases. The two possible cases are as follows: In a first possible case, if the AMF receives a subscription data change notification message that is sent by the UDM and that is used to indicate that the subscription data of the user equipment has changed, the AMF sends the tracking indication message to the network device. In a second possible case, if receiving a detection request message from the UTM, the AMF sends the tracking indication message to the user equipment. The following separately describes in detail a method for detecting an unauthorized uncrewed aerial vehicle in the two possible cases.

Figure 4:
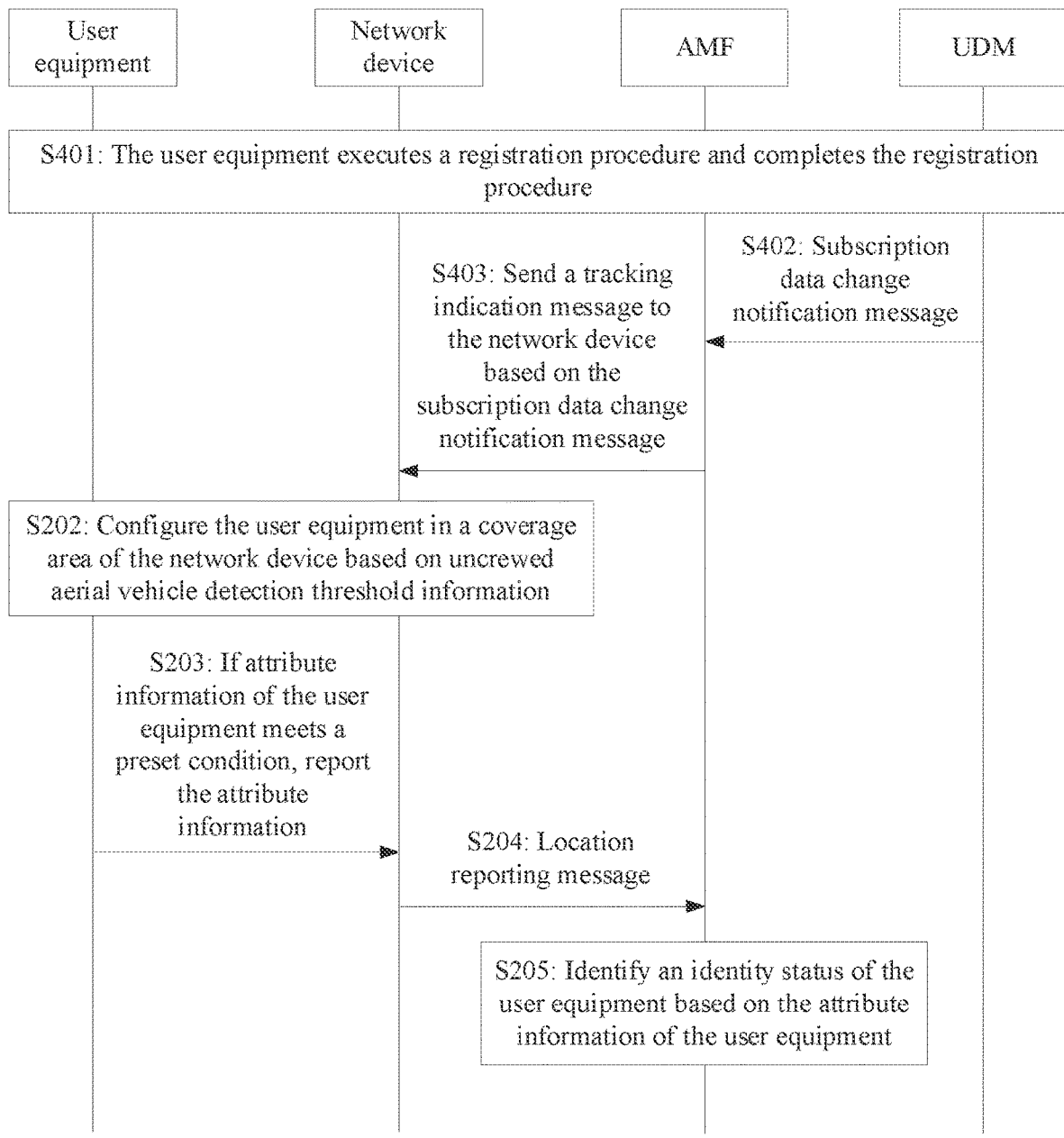
FIG. 4 is a schematic diagram of still another method for detecting an unauthorized uncrewed aerial vehicle according to an embodiment of this application.

In the first possible case, if the AMF receives the subscription data change notification message sent by the UDM and that is used to indicate that the subscription data of the user equipment has changed, the AMF sends the tracking indication message to the network device. For example, refer to FIG. 4. FIG. 4 is a schematic diagram of still another method for detecting an unauthorized uncrewed aerial vehicle according to an embodiment of this application. The method for detecting an unauthorized uncrewed aerial vehicle may further include the following steps.

S401: User equipment performs a registration procedure to complete the registration procedure.

When the user equipment is registered, it is indicated that the user equipment is used for uncrewed aerial system communication.

It should be noted that, in this embodiment of this application, for a specific implementation in which the user equipment performs the registration procedure to complete the entire registration procedure, refer to a registration procedure of the user equipment in the conventional technology. Details are not described herein in this embodiment of this application.

S402: An AMF receives a subscription data change notification message from a UDM.

The subscription data change notification message is used to indicate that subscription data of the user equipment has changed. For example, the subscription data change notification message may include an identifier of the user equipment whose subscription data changes. It may be understood that, in this embodiment of this application, the subscription data may change because the user equipment originally has an uncrewed aerial system communication capability, but now no longer has the uncrewed aerial system communication capability, or because in a specific area, the user equipment changes from originally-allowed flight to not-allowed flight.

After detecting that subscription data of one or more user equipments changes, a UDM sends a subscription data change notification message to the AMF, to notify the AMF that the subscription data of the user equipment changes. After receiving the subscription data change notification message, the AMF performs the following S403.

S403: The AMF sends a tracking indication message to a network device based on the subscription data change notification message.

The tracking indication message is used to indicate to report attribute information of user equipment in a coverage area of the network device when the attribute information of the user equipment meets a preset condition, and the attribute information may include location information and/or speed information. Certainly, the tracking indication message may further indicate that the user equipment whose subscription data has changed no longer has the uncrewed aerial system communication capability.

It should be noted that the user equipment that is located in the coverage area and that is indicated by the tracking indication message in S403 is different from the user equipment that is located in the coverage area of the network device and that is indicated by the tracking indication message in the foregoing S201. The user equipment in the foregoing S201 is user equipment in the coverage area of the network device, and has no directivity. The user equipment that is located in the coverage area and that is indicated in the tracking indication message in S403 is user equipment whose subscription data has changed, and has directivity.

After the tracking indication message is sent to the network device, the foregoing S202 to S205 may be performed. The network device configures the user equipment in the coverage area of the network device based on the uncrewed aerial vehicle detection threshold information, and if the attribute information of the user equipment meets the preset condition, the user equipment reports the attribute information of the user equipment to the network device. The network device sends a location reporting message to the AMF, so that the AMF identifies an identity status of the user equipment based on the attribute information of the user equipment that is included in the location reporting message. For details, refer to the related descriptions in the foregoing S202 to S205. Details are not described herein again in this embodiment of this application.

Further, if the AMF identifies, based on the attribute information included in the received location reporting message, that the user equipment is an unauthorized uncrewed aerial vehicle, the foregoing S206 and S207 may be directly performed. If the AMF is insufficient to identify the identity status of the user equipment based on the attribute information included in the received location reporting message, S301 to S304 are performed, and the attribute information of the user equipment needs to be obtained again, so as to identify the identity status of the user equipment based on the attribute information of the user equipment that is obtained again. After the identity status of the user equipment is further identified according to the foregoing S301 to S304, if the user equipment is an unauthorized uncrewed aerial vehicle, the foregoing S206 may be performed to send an unauthorized uncrewed aerial vehicle reporting message to the uncrewed aerial vehicle traffic management (UTM) network element device, so that the UTM obtains information about the unauthorized uncrewed aerial vehicle. Certainly, the foregoing S207 may also be performed to send a restriction indication message to the network device, to indicate the network device to restrict an available network resource of the user equipment.

Figure 5:
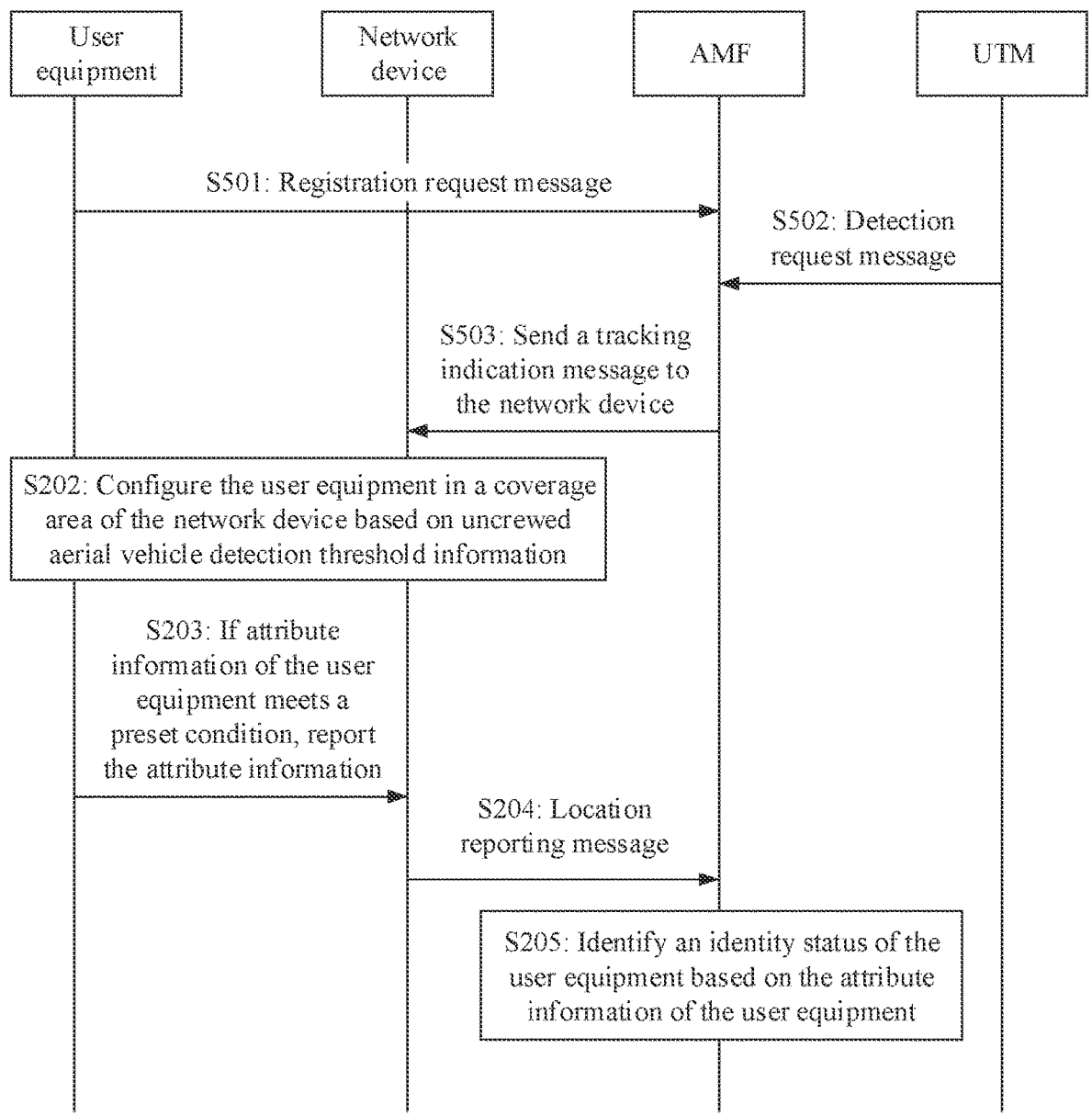
FIG. 5 is a schematic diagram of a method for detecting an unauthorized uncrewed aerial vehicle according to an embodiment of this application.

In the second possible case, if receiving the detection request message from the UTM, the AMF sends the tracking indication message to the network device. For example, refer to FIG. 5. FIG. 5 is a schematic diagram of a method for detecting an unauthorized uncrewed aerial vehicle according to an embodiment of this application. The method for detecting an unauthorized uncrewed aerial vehicle may further include the following steps.

S501: An AMF receives a registration request message sent by user equipment.

The registration request message is used to indicate that the user equipment is used for uncrewed aerial system communication. For example, the registration request message may include an identifier of the user equipment, and may also include a registration area identifier of the user equipment.

S502: The AMF receives a detection request message of a UTM.

Optionally, the detection request message may include information about a specific area and/or threshold information used to indicate the specific area. Certainly, the detection request message may also include time information. When the detection request message includes the information about the specific area and the time information, the detection request message is used to indicate the AMF to detect an unauthorized uncrewed aerial vehicle in an area within a time period. Further, the information about the specific area may include a preset condition, and the preset condition may include a height, an average moving speed, and an instantaneous moving speed that correspond to the specific area. To be specific, in the specific area, if attribute information of user equipment reaches one or more of thresholds included in the preset condition, whether the user equipment is an unauthorized uncrewed aerial vehicle needs to be further determined. For example, the specific area may be a flight area in some specific scenarios, for example, a campus area holding a sports meeting, or an area holding a concert.

It may be understood that the specific area in this application is at a cell granularity, a TA granularity, a TA list granularity, or the like. When the UTM sends the detection request message to the AMF, information such as the height, the average moving speed, and the instantaneous moving speed that correspond to the specific area is stored in a list and is carried in a list form in the detection request message, and the detection request message is sent to the AMF, so that the AMF obtains the information such as the height, the average moving speed, and the instantaneous moving speed that correspond to the specific area.

S503: Send a tracking indication message to a network device.

The tracking indication message is used to indicate to report attribute information of user equipment in a coverage area of the network device when the attribute information of the user equipment meets a preset condition, and the attribute information may include location information and/or speed information.

Optionally, the tracking indication message may include the preset condition, and the preset condition may be uncrewed aerial vehicle detection threshold information. For example, the uncrewed aerial vehicle detection threshold information may include a height, an average moving speed, and an instantaneous moving speed that correspond to an intersection area. It may be understood that, if intersections exist between a registration area of the user equipment and a plurality of specific areas, a minimum value in uncrewed aerial vehicle detection thresholds corresponding to all intersection areas is selected as target uncrewed aerial vehicle target detection threshold information, and the target detection threshold information is sent to the network device. Optionally, the uncrewed aerial vehicle detection thresholds corresponding to all the areas may be detection threshold information preconfigured by an operator, or may be received detection threshold information sent by the UTM. For details, refer to the related description in S201 in the embodiment shown in FIG. 2. Herein, Details are not described again in this embodiment of this application.

Optionally, when the detection request message may include information about a specific area, if an intersection area exists between the registration area of the user equipment and the specific area included in the detection request message, the AMF sends the tracking indication message to the network device. The tracking indication message may include a reporting period, and the reporting period needs to be greater than or equal to a time period in which the network device obtains the attribute information of the user equipment.

It should be noted that, in this embodiment of this application, the user equipment that is located in the coverage area and that is indicated by the tracking indication message in S503 is different from the user equipment that is located in the coverage area of the network device and that is indicated by the tracking indication message in the foregoing S201. The user equipment in the foregoing S201 is user equipment in the coverage area of the network device, and has no directivity. The user equipment that is located in the coverage area and that is indicated in the tracking indication message in S503 in this embodiment is user equipment whose registration area has an intersection with a specific area, and has directivity.

Similarly, after the tracking indication message is sent to the network device, the foregoing S202 to S205 may be performed. The network device configures the user equipment in the coverage area of the network device based on the uncrewed aerial vehicle detection threshold information, and if the attribute information of the user equipment meets the preset condition, the user equipment reports the attribute information of the user equipment to the network device. The network device sends a location reporting message to the AMF, so that the AMF identifies an identity status of the user equipment based on the attribute information of the user equipment that is included in the location reporting message. For details, refer to the related descriptions in the foregoing S202 to S205. Details are not described herein again in this embodiment of this application.

Further, if the AMF identifies, based on the attribute information included in the received location reporting message, that the user equipment is an unauthorized uncrewed aerial vehicle, the foregoing S206 and S207 may be directly performed. If the AMF is insufficient to identify the identity status of the user equipment based on the attribute information included in the received location reporting message, S301 to S304 are performed, and the attribute information of the user equipment needs to be obtained again, so as to identify the identity status of the user equipment based on the attribute information of the user equipment that is obtained again. After the identity status of the user equipment is further identified according to the foregoing S301 to S304, if the user equipment is an unauthorized uncrewed aerial vehicle, the foregoing S206 may be performed to send an unauthorized uncrewed aerial vehicle reporting message to the uncrewed aerial vehicle traffic management (UTM) network element device, so that the UTM obtains information about the unauthorized uncrewed aerial vehicle. Certainly, the foregoing S207 may also be performed to send a restriction indication message to the network device, to indicate the network device to restrict an available network resource of the user equipment.

Figure 6:
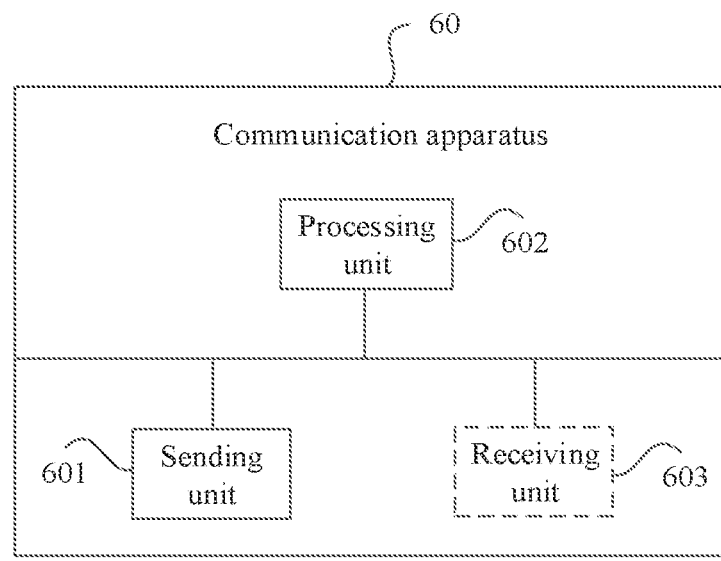
FIG. 6 is a schematic diagram of a structure of a communication apparatus according to an embodiment of this application.

FIG. 6 is a schematic diagram of a structure of a communication apparatus 60 according to an embodiment of this application. For example, refer to FIG. 6. The communication apparatus 60 may include:

a sending unit 601, configured to send a tracking indication message to a network device, where the tracking indication message is used to indicate to report attribute information of user equipment in a coverage area of the network device when the attribute information of the user equipment meets a preset condition, and the attribute information includes location information and/or speed information; and a processing unit 602, configured to obtain the attribute information of the user equipment, and identify an identity status of the user equipment based on the attribute information of the user equipment, where the identity status includes an authorized uncrewed aerial vehicle or an unauthorized uncrewed aerial vehicle.

Optionally, the processing unit 602 is specifically configured to identify an identity of the user equipment based on the attribute information of the user equipment and subscription data of the user equipment, to obtain the identity status of the user equipment.

Optionally, the communication apparatus 60 further includes a receiving unit 603, where the sending unit 601 is further configured to send a subscription data query message to a unified data management (UDM) network element, where the query message is used to indicate the UDM device to query the subscription data of the user equipment; and the receiving unit 603 is configured to receive a subscription data response message from the UDM, where the subscription data response message includes the subscription data of the user equipment.

Optionally, the sending unit 601 is further configured to send an analysis request message to a network data analytics network element NWDAF, where the analysis request message includes the attribute information of the user equipment, and the analysis request message is used to indicate the NWDAF device to identify the identity status of the user equipment based on the attribute information of the user equipment; and the receiving unit 603 is further configured to receive an analysis response message from the NWDAF device, where the analysis response message includes the identity status of the user equipment.

Optionally, if the identity status of the user equipment is an unauthorized uncrewed aerial vehicle, the sending unit 601 is further configured to send an unauthorized uncrewed aerial vehicle reporting message to an uncrewed aerial vehicle traffic management (UTM) network element device, where the unauthorized uncrewed aerial vehicle reporting message is used to indicate that the user equipment is an unauthorized uncrewed aerial vehicle.

Optionally, if the identity status of the user equipment is an unauthorized uncrewed aerial vehicle, the sending unit 601 is further configured to send a restriction indication message to the network device, where the restriction indication information is used to indicate the network device to restrict an available network resource of the user equipment.

Optionally, the receiving unit 603 is further configured to receive a subscription data change notification message from the UDM, where the subscription data change notification message is used to indicate that the subscription data of the user equipment has changed; and the sending unit 601 is specifically configured to send the tracking indication message to the network device based on the subscription data change notification message.

Optionally, the receiving unit 603 is further configured to receive a detection request message from a UTM; and the sending unit 601 is specifically configured to send the tracking indication message to the network device.

Optionally, the detection request message includes information about a specific area, and the sending unit 601 is specifically configured to send the tracking indication message to the network device if an intersection area exists between a registration area of the user equipment and the specific area.

The communication apparatus 60 shown in this embodiment of this application may perform the method for detecting an unauthorized uncrewed aerial vehicle on an AMF side in the embodiments shown in FIG. 2 to FIG. 5. An implementation principle and beneficial effects thereof are similar to those of the method for detecting an unauthorized uncrewed aerial vehicle on the AMF side. Details are not described herein again.

Figure 7:
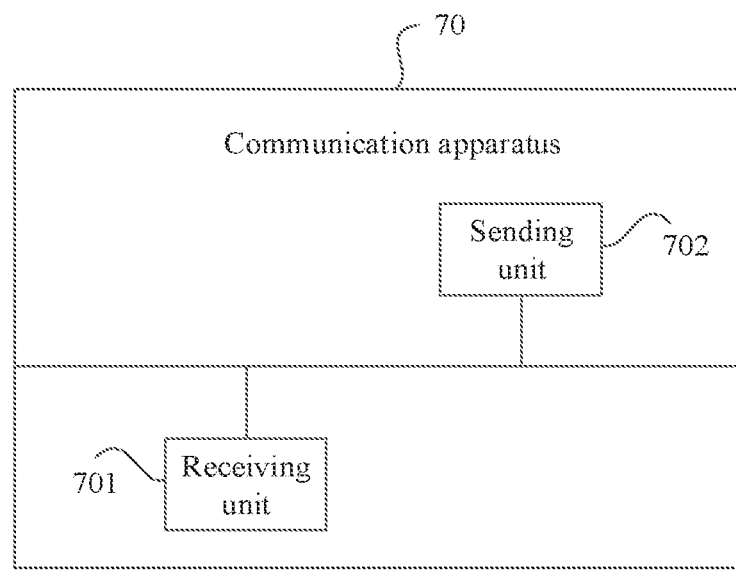
FIG. 7 is a schematic diagram of a structure of another communication apparatus according to an embodiment of this application.

FIG. 7 is a schematic diagram of a structure of another communication apparatus 70 according to an embodiment of this application. For example, refer to FIG. 7. The communication apparatus 70 may include:

a receiving unit 701, configured to receive a tracking indication message from an access and mobility management function (AMF) network element, where the tracking indication message is used to indicate to report attribute information of user equipment in a coverage area of a network device when the attribute information of the user equipment meets a preset condition, and the attribute information includes location information and/or speed information; and a sending unit 702, configured to send the attribute information of the user equipment to the AMF.

Optionally, the sending unit 702 is further configured to send a location reporting indication message to the user equipment, where the location reporting indication message is used to indicate to report the attribute information of the user equipment when the attribute information of the user equipment meets the preset condition; and the receiving unit 701 is further configured to receive the attribute information from the user equipment.

Optionally, if the user equipment is an unauthorized uncrewed aerial vehicle, the receiving unit 701 is further configured to receive a restriction indication message from the AMF, where the restriction indication information is used to indicate the network device to restrict an available network resource of the user equipment.

The communication apparatus 70 shown in this embodiment of this application may perform the method for detecting an unauthorized uncrewed aerial vehicle on a network device side in the embodiments shown in FIG. 2 to FIG. 5. An implementation principle and beneficial effects thereof are similar to those of the method for detecting an unauthorized uncrewed aerial vehicle on the network device side. Details are not described herein again.

Figure 8:
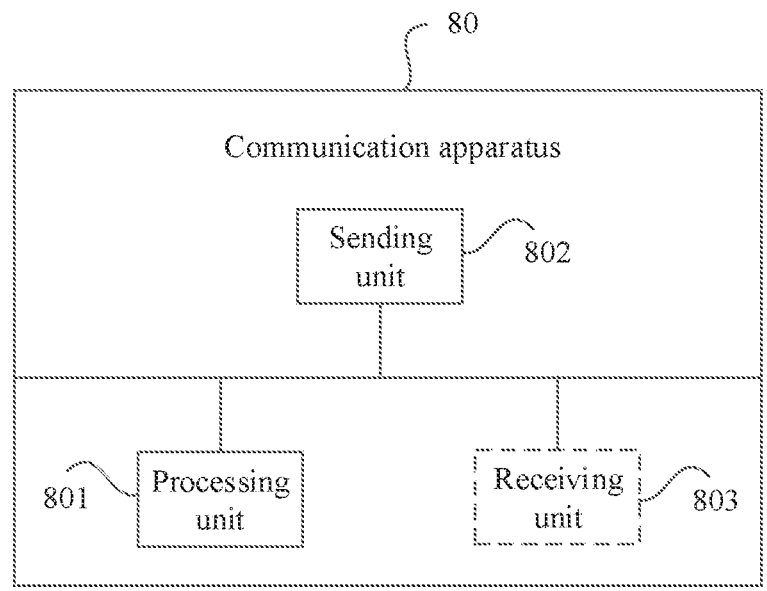
FIG. 8 is a schematic diagram of a structure of still another communication apparatus according to an embodiment of this application.

FIG. 8 is a schematic diagram of a structure of still another communication apparatus 80 according to an embodiment of this application. For example, refer to FIG. 8. The communication apparatus 80 may include:

a processing unit 801, configured to obtain whether to send a detection request message; and a sending unit 802, configured to send the detection request message to an uncrewed aerial vehicle traffic management network element AMF when it is determined to send the detection request message.

Optionally, the detection request message includes information about a specific area.

Optionally, if an identity status of user equipment in a coverage area of a network device is an unauthorized uncrewed aerial vehicle, the communication apparatus 80 may further include:

a receiving unit 803, configured to receive an unauthorized uncrewed aerial vehicle reporting message from an access and mobility management function (AMF) network element, where the unauthorized uncrewed aerial vehicle reporting message is used to indicate that the user equipment is an unauthorized uncrewed aerial vehicle.

The communication apparatus 80 shown in this embodiment of this application may perform the method for detecting an unauthorized uncrewed aerial vehicle on a UTM side in the embodiments shown in FIG. 2 to FIG. 5. An implementation principle and beneficial effects thereof are similar to those of the method for detecting an unauthorized uncrewed aerial vehicle on the UTM side. Details are not described herein again.

Figure 9:
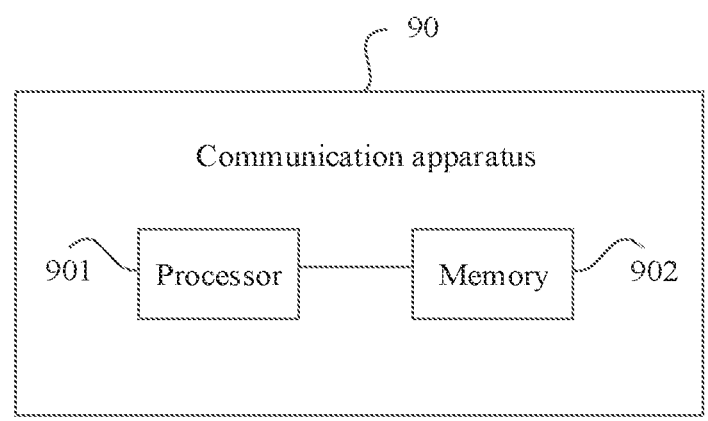
FIG. 9 is a schematic diagram of a structure of a communication apparatus according to an embodiment of this application.

FIG. 9 is a schematic diagram of a structure of a communication apparatus 90 according to an embodiment of this application. For example, refer to FIG. 9. The communication apparatus 90 may include a memory 902 and a processor 901.

The memory 902 is configured to store program instructions.

The processor 901 is configured to read the program instructions in the memory 902, and perform, according to the program instructions in the memory 902, the method for detecting an unauthorized uncrewed aerial vehicle on the AMF side in the embodiments shown in FIG. 2 to FIG. 5, or the method for detecting an unauthorized uncrewed aerial vehicle on the network device side in the embodiments shown in FIG. 2 to FIG. 5, or the method for detecting an unauthorized uncrewed aerial vehicle on the UTM side in the embodiments shown in FIG. 2 to FIG. 5. An implementation principle and beneficial effects thereof are similar to those of the method for detecting an unauthorized uncrewed aerial vehicle. Details are not described herein again.

An embodiment of this application further provides a computer storage medium, including instructions. When the instructions are run by one or more processors, a communication apparatus is enabled to perform the method for detecting an unauthorized uncrewed aerial vehicle on the AMF side in the embodiments shown in FIG. 2 to FIG. 5, or the method for detecting an unauthorized uncrewed aerial vehicle on the network device side in the embodiments shown in FIG. 2 to FIG. 5, or the method for detecting an unauthorized uncrewed aerial vehicle on the UTM side in the embodiments shown in FIG. 2 to FIG. 5. An implementation principle and beneficial effects thereof are similar to those of the method for detecting an unauthorized uncrewed aerial vehicle. Details are not described herein again.

An embodiment of this application further provides a chip, and the chip stores a computer program. When the computer program is executed by a processor, the method for detecting an unauthorized uncrewed aerial vehicle on the AMF side in the embodiments shown in FIG. 2 to FIG. 5, or the method for detecting an unauthorized uncrewed aerial vehicle on the network device side in the embodiments shown in FIG. 2 to FIG. 5, or the method for detecting an unauthorized uncrewed aerial vehicle on the UTM side in the embodiments shown in FIG. 2 to FIG. 5 is performed. An implementation principle and beneficial effects thereof are similar to those of the method for detecting an unauthorized uncrewed aerial vehicle. Details are not described herein again.

An embodiment of this application further provides a communication system. The communication system may include user equipment and a first communication apparatus. The first communication apparatus is configured to perform the method for detecting an unauthorized uncrewed aerial vehicle on the network device side in the embodiments shown in FIG. 2 to FIG. 5. An implementation principle and beneficial effects thereof are similar to those of the method for detecting an unauthorized uncrewed aerial vehicle. Details are not described herein again.

An embodiment of this application further provides a communication system, and the communication system includes a first communication apparatus and a second communication apparatus. The first communication apparatus is configured to perform the method for detecting an unauthorized uncrewed aerial vehicle on the network device side in the embodiments shown in FIG. 2 to FIG. 5. The second communication apparatus is configured to perform the method for detecting an unauthorized uncrewed aerial vehicle on the AMF side in the embodiments shown in FIG. 2 to FIG. 5. An implementation principle and beneficial effects thereof are similar to those of the method for detecting an unauthorized uncrewed aerial vehicle. Details are not described herein again.

An embodiment of this application further provides a communication system, and the communication system includes a second communication apparatus and a third communication apparatus. The second communication apparatus is configured to perform the method for detecting an unauthorized uncrewed aerial vehicle on the AMF side in the embodiments shown in FIG. 2 to FIG. 5. The third communication apparatus is configured to perform the method for detecting an unauthorized uncrewed aerial vehicle on the UTM side in the embodiments shown in FIG. 2 to FIG. 5. An implementation principle and beneficial effects thereof are similar to those of the method for detecting an unauthorized uncrewed aerial vehicle. Details are not described herein again.

The processor in the foregoing embodiments may be a general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or transistor logic device, or a discrete hardware component. The processor may implement or perform the methods, the steps, and the logical block diagrams that are disclosed in the embodiments of this application. The general-purpose processor may be a microprocessor, or the processor may be any conventional processor or the like. Steps of the methods disclosed with reference to the embodiments of this application may be directly executed and accomplished by using a hardware decoding processor, or may be executed and accomplished by using a combination of hardware and software modules in a decoding processor. The software module may be located in a mature storage medium in the art, such as a random access memory (random access memory, RAM), a flash memory, a read-only memory (read-only memory, ROM), a programmable read-only memory, an electrically erasable programmable memory, a register, or the like. The storage medium is located in the memory, and the processor reads instructions in the memory and completes the steps in the foregoing methods in combination with hardware of the processor.

In the several embodiments provided in this application, it should be understood that the disclosed apparatus and method may be implemented in other manners. For example, the described apparatus embodiment is merely an example. For example, division into units is merely a logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one location, or may be distributed on a plurality of network units. Apart or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of hardware and a software functional unit.

What is claimed is:

1. A method for detecting an unauthorized, uncrewed aerial vehicle, comprising:
    receiving, by an access and mobility management function (AMF) network element, uncrewed aerial vehicle detection threshold information, wherein the uncrewed aerial vehicle detection threshold information includes at least one of an above ground level (AGL) threshold or a speed threshold;
    sending, by the AMF network element, a tracking indication message to a network device, wherein the tracking indication message includes the uncrewed aerial vehicle detection threshold information, the tracking indication message indicates to report attribute information of a user equipment in a coverage area of the network device when the attribute information of the user equipment meets a preset condition, and the attribute information of the user equipment comprises at least one of location information or speed information;
    receiving, by the AMF network element from the network device, the attribute information of the user equipment, wherein the attribute information of the user equipment meets the preset condition; and
    identifying, by the AMF network element, an identity status of the user equipment based on the attribute information of the user equipment, wherein the identity status comprises an authorized uncrewed aerial vehicle or an unauthorized uncrewed aerial vehicle.

2. The method according to claim 1, wherein the identifying the identity status of the user equipment based on the attribute information of the user equipment comprises:
    identifying an identity of the user equipment based on the attribute information of the user equipment and subscription data of the user equipment, to obtain the identity status of the user equipment.

3. The method according to claim 2, wherein before the identifying the identity status of the user equipment based on the attribute information of the user equipment and the subscription data of the user equipment, the method comprises:
    sending a subscription data query message to a unified data management (UDM) device, wherein the subscription data query message indicates the UDM device to query the subscription data of the user equipment; and
    receiving a subscription data response message from the UDM device, wherein the subscription data response message comprises the subscription data of the user equipment.

4. The method according to claim 3, wherein the sending the tracking indication message to the network device comprises:
    receiving a subscription data change notification message from the UDM device, wherein the subscription data change notification message indicates that the subscription data of the user equipment has changed; and
    sending the tracking indication message to the network device based on the subscription data change notification message.

5. The method according to claim 1, wherein the identifying the identity status of the user equipment based on the attribute information of the user equipment comprises:
    sending an analysis request message to a network data analytics network element (NWDAF) device, wherein the analysis request message comprises the attribute information of the user equipment, and the analysis request message indicates the NWDAF device to identify the identity status of the user equipment based on the attribute information of the user equipment; and
    receiving an analysis response message from the NWDAF device, wherein the analysis response message comprises the identity status of the user equipment.

6. The method according to claim 1, wherein when the identity status of the user equipment is the unauthorized uncrewed aerial vehicle, the method comprises:
    sending an unauthorized uncrewed aerial vehicle reporting message to an uncrewed aerial vehicle traffic management (UTM) network element, wherein the unauthorized uncrewed aerial vehicle reporting message indicates that the user equipment is an unauthorized uncrewed aerial vehicle.

7. The method according to claim 6, wherein the sending the tracking indication message to the network device comprises:
    receiving a detection request message from the UTM network element; and
    sending the tracking indication message to the network device.

8. The method according to claim 7, wherein the detection request message comprises information about a specific area, and wherein the sending the tracking indication message to the network device comprises:
    sending the tracking indication message to the network device when an intersection area exists between a registration area of the user equipment and the specific area.

9. The method according to claim 1, wherein when the identity status of the user equipment is the unauthorized uncrewed aerial vehicle, the method comprises:
    sending a restriction indication message to the network device, wherein the restriction indication message indicates the network device to restrict an available network resource of the user equipment.

10. The method according to claim 1, wherein the uncrewed aerial vehicle detection threshold information is received from an uncrewed aerial system traffic management (UTM) network element.

11. A method for detecting an unauthorized uncrewed aerial vehicle, comprising:
receiving, by a network device, a tracking indication message from an access and mobility management function (AMF) network element, wherein the tracking indication message includes uncrewed aerial vehicle detection threshold information, the uncrewed aerial vehicle detection threshold information includes at least one of an above ground level (AGL) threshold or a speed threshold, the tracking indication message indicates to report attribute information of a user equipment in a coverage area of the network device when the attribute information of the user equipment meets a preset condition, and the attribute information of the user equipment comprises at least one of location information or speed information; and
sending, by the network device, the attribute information of the user equipment to the AMF network element, wherein the attribute information of the user equipment meets the preset condition.

12. The method according to claim 11, wherein before the sending the attribute information of the user equipment to the AMF network element, the method comprises:
sending a location reporting indication message to the user equipment, wherein the location reporting indication message indicates to report the attribute information of the user equipment when the attribute information of the user equipment meets the preset condition; and
receiving the attribute information from the user equipment.

13. The method according to claim 11, wherein when the user equipment is the unauthorized uncrewed aerial vehicle, the method comprises:
receiving a restriction indication message from the AMF network element, wherein the restriction indication message indicates the network device to restrict an available network resource of the user equipment.

14. A communication apparatus, wherein the communication apparatus comprises a non-transitory computer-readable storage medium storing instructions, and one or more processors in communication with the non-transitory computer-readable storage medium, wherein the instructions, when executed by the one or more processors, cause the communication apparatus to:
receive, by an access and mobility management function (AMF) network element, uncrewed aerial vehicle detection threshold information, wherein the uncrewed aerial vehicle detection threshold information includes at least one of an above ground level (AGL) threshold or a speed threshold;
send, by the AMF network element, a tracking indication message to a network device, wherein the tracking indication message includes the uncrewed aerial vehicle detection threshold information, the tracking indication message indicates to report attribute information of a user equipment in a coverage area of the network device when the attribute information of the user equipment meets a preset condition, and the attribute information of the user equipment comprises at least one of location information or speed information;
receive, by the AMF network element from the network device, the attribute information of the user equipment, wherein the attribute information of the user equipment meets the preset condition; and
identify, by the AMF network element, an identity status of the user equipment based on the attribute information of the user equipment, wherein the identity status comprises an authorized uncrewed aerial vehicle or an unauthorized uncrewed aerial vehicle.

15. The communication apparatus according to claim 14, wherein the instructions, when executed by the one or more processors, cause the communication apparatus to:
identify an identity of the user equipment based on the attribute information of the user equipment and subscription data of the user equipment, to obtain the identity status of the user equipment.

16. The communication apparatus according to claim 15, wherein the communication apparatus comprises a receiver, wherein the instructions, when executed by the one or more processors, cause the communication apparatus to:
send a subscription data query message to a unified data management (UDM) device, wherein the subscription data query message indicates the UDM device to query the subscription data of the user equipment; and
receive, by the receiver, a subscription data response message from the UDM device, wherein the subscription data response message comprises the subscription data of the user equipment.

17. The communication apparatus according to claim 16, wherein the instructions, when executed by the one or more processors, cause the communication apparatus to:
send an analysis request message to a network data analytics network element (NWDAF) device, wherein the analysis request message comprises the attribute information of the user equipment, and the analysis request message indicates the NWDAF device to identify the identity status of the user equipment based on the attribute information of the user equipment; and
receive, by the receiver, an analysis response message from the NWDAF device, wherein the analysis response message comprises the identity status of the user equipment.

18. The communication apparatus according to claim 16, wherein the instructions, when executed by the one or more processors, cause the communication apparatus to:
receive, by a receiver, a subscription data change notification message from the UDM device, wherein the subscription data change notification message indicates that the subscription data of the user equipment has changed; and
send the tracking indication message to the network device based on the subscription data change notification message.

19. The communication apparatus according to claim 14, wherein when the identity status of the user equipment is an unauthorized uncrewed aerial vehicle, the instructions, when executed by the one or more processors, cause the communication apparatus to:
send an unauthorized uncrewed aerial vehicle reporting message to an uncrewed aerial vehicle traffic management (UTM) network element, wherein the unauthorized uncrewed aerial vehicle reporting message indicates that the user equipment is an unauthorized uncrewed aerial vehicle.

20. The communication apparatus according to claim 14, wherein when the identity status of the user equipment is an unauthorized uncrewed aerial vehicle, the instructions, when executed by the one or more processors, cause the communication apparatus to:
send a restriction indication message to the network device, wherein the restriction indication message indicates the network device to restrict an available network resource of the user equipment.

* * * * *